(12) United States Patent
Tauchi et al.

(10) Patent No.: US 7,062,154 B2
(45) Date of Patent: Jun. 13, 2006

(54) MAGNETIC-TAPE RECORDING APPARATUS, MAGNETIC-TAPE RECORDING METHOD, MAGNETIC-TAPE FORMAT, AND RECORDING MEDIUM

(75) Inventors: Yoichiro Tauchi, Saitama (JP); Yasutaka Kotani, Tokyo (JP); Toshinori Kozai, Kanagawa (JP)

(73) Assignee: Sony Corporation, Tokyo (JP)

(*) Notice: Subject to any disclaimer, the term of this patent is extended or adjusted under 35 U.S.C. 154(b) by 1039 days.

(21) Appl. No.: 09/824,959

(22) Filed: Apr. 3, 2001

(65) Prior Publication Data

US 2001/0055473 A1 Dec. 27, 2001

(30) Foreign Application Priority Data

Apr. 4, 2000 (JP) ............... 2000-102129

(51) Int. Cl.
 *H04N 5/91* (2006.01)
(52) U.S. Cl. .................................. 386/96; 386/124
(58) Field of Classification Search ................ 386/46, 386/54, 103, 95, 96, 67, 111, 112, 124; 360/18
 See application file for complete search history.

(56) References Cited

U.S. PATENT DOCUMENTS

| 5,416,651 A | 5/1995 | Uetake et al. |
| 5,574,570 A * | 11/1996 | Ohkuma et al. ............. 386/103 |
| 5,933,572 A | 8/1999 | Nagasawa et al. |
| 5,940,016 A * | 8/1999 | Lee ............................... 341/67 |
| 6,026,212 A * | 2/2000 | Oguro ......................... 386/67 |
| 6,115,537 A * | 9/2000 | Yamada et al. ............... 386/109 |
| 6,301,065 B1* | 10/2001 | Oguro ......................... 360/18 |
| 6,496,646 B1* | 12/2002 | Ohta ........................... 386/46 |
| 6,658,195 B1* | 12/2003 | Senshu et al. ................ 386/54 |

FOREIGN PATENT DOCUMENTS

| EP | 0 723 267 | 7/1996 |
| EP | 0 940 804 | 9/1999 |
| EP | 1 043 725 | 10/2000 |

* cited by examiner

*Primary Examiner*—Huy Nguyen
(74) *Attorney, Agent, or Firm*—Frommer Lawrence & Haug LLP; William S. Frommer; Paul A. Levy

(57) ABSTRACT

A magnetic-tape recording apparatus for recording digital data on a magnetic tape by a rotating head includes a first obtaining unit for obtaining first-group data, including video data, audio data, or search data. A second obtaining unit obtains second-group data, including sub-code data related to the first-group data. A synthesizing unit synthesizes the first-group data and the second-group data such that they are continuous without any space disposed therebetween, on each of two sub-tracks formed with a gap sandwiched therebetween on a track in the magnetic tape. A sending unit sends data synthesized by the synthesizing unit to the rotating head in order to record the data on the magnetic tape.

4 Claims, 30 Drawing Sheets

| RUN PATTERN | CODEWORD<br>MSB                                                                                LSB |
|---|---|
| PATTERN A | 0 0 0 1 1 1 0 0 0 1 1 1 0 0 0 0 0 1 1 1 0 0 0 1 1 |
| PATTERN B | 1 1 1 0 0 0 1 1 1 0 0 0 1 1 1 1 1 0 0 0 1 1 1 0 0 |

FIG. 11

| ORDER OF RECORDING | CODEWORD MSB LSB | ORDER OF RECORDING | CODEWORD MSB LSB | ORDER OF RECORDING | CODEWORD MSB LSB | ORDER OF RECORDING | CODEWORD MSB LSB |
|---|---|---|---|---|---|---|---|
| 0 | 10001 01110 | 40 | 10001 01110 | 80 | 10001 01110 | 120 | 10001 01110 |
| 1 | 10001 01110 | 41 | 10001 01110 | 81 | 10001 01110 | 121 | 10001 01110 |
| 2 | 10001 01110 | 42 | 10001 01110 | 82 | 10001 01110 | 122 | 10001 01110 |
| 3 | 10001 01110 | 43 | 10001 01110 | 83 | 10001 01110 | 123 | 10001 01110 |
| 4 | 10001 01110 | 44 | 10001 01110 | 84 | 10001 01110 | 124 | 10001 01110 |
| 5 | 10001 01110 | 45 | 10001 01110 | 85 | 10001 01110 | 125 | 10001 01110 |
| 6 | 10001 01110 | 46 | 10001 01110 | 86 | 10001 01110 | 126 | 10001 01110 |
| 7 | 10001 01110 | 47 | 10001 01110 | 87 | 10001 01110 | 127 | 10001 01110 |
| 8 | 10001 01110 | 48 | 10001 01110 | 88 | 10001 01110 | 128 | 10001 01110 |
| 9 | 10001 01110 | 49 | 10001 01110 | 89 | 10001 01110 | 129 | 10001 01110 |
| 10 | 10001 01110 | 50 | 10001 01110 | 90 | 10001 01110 | 130 | 10001 01110 |
| 11 | 10001 01110 | 51 | 10001 01110 | 91 | 10001 01110 | 131 | 10001 01110 |
| 12 | 10001 01110 | 52 | 10001 01110 | 92 | 10001 01110 | 132 | 10001 01110 |
| 13 | 10001 01110 | 53 | 10001 01110 | 93 | 10001 01110 | 133 | 10001 01110 |
| 14 | 10001 01110 | 54 | 10001 01110 | 94 | 10001 01110 | 134 | 10001 01110 |
| 15 | 10001 01110 | 55 | 10001 01110 | 95 | 10001 01110 | 135 | 10001 01110 |
| 16 | 10001 01110 | 56 | 10001 01110 | 96 | 10001 01110 | 136 | 10001 01110 |
| 17 | 10001 01110 | 57 | 10001 01110 | 97 | 10001 01110 | 137 | 10001 01110 |
| 18 | 10001 01110 | 58 | 10001 01110 | 98 | 10001 01110 | 138 | 10001 01110 |
| 19 | 10001 01110 | 59 | 10001 01110 | 99 | 10001 01110 | 139 | 10001 01110 |
| 20 | 10001 01110 | 60 | 10001 01110 | 100 | 10001 01110 | | |
| 21 | 10001 01110 | 61 | 10001 01110 | 101 | 10001 01110 | | |
| 22 | 10001 01110 | 62 | 10001 01110 | 102 | 10001 01110 | | |
| 23 | 10001 01110 | 63 | 10001 01110 | 103 | 10001 01110 | | |
| 24 | 10001 01110 | 64 | 10001 01110 | 104 | 10001 01110 | | |
| 25 | 10001 01110 | 65 | 10001 01110 | 105 | 10001 01110 | | |
| 26 | 10001 01110 | 66 | 10001 01110 | 106 | 10001 01110 | | |
| 27 | 10001 01110 | 67 | 10001 01110 | 107 | 10001 01110 | | |
| 28 | 10001 01110 | 68 | 10001 01110 | 108 | 10001 01110 | | |
| 29 | 10001 01110 | 69 | 10001 01110 | 109 | 10001 01110 | | |
| 30 | 10001 01110 | 70 | 10001 01110 | 110 | 10001 01110 | | |
| 31 | 10001 01110 | 71 | 10001 01110 | 111 | 10001 01110 | | |
| 32 | 10001 01110 | 72 | 10001 01110 | 112 | 10001 01110 | | |
| 33 | 10001 01110 | 73 | 10001 01110 | 113 | 10001 01110 | | |
| 34 | 10001 01110 | 74 | 10001 01110 | 114 | 10001 01110 | | |
| 35 | 10001 01110 | 75 | 10001 01110 | 115 | 10001 01110 | | |
| 36 | 10001 01110 | 76 | 10001 01110 | 116 | 10001 01110 | | |
| 37 | 10001 01110 | 77 | 10001 01110 | 117 | 10001 01110 | | |
| 38 | 10001 01110 | 78 | 10001 01110 | 118 | 10001 01110 | | |
| 39 | 10001 01110 | 79 | 10001 01110 | 119 | 10001 01110 | | |

FIG. 12

| ORDER OF RECORDING | CODEWORD MSB LSB | ORDER OF RECORDING | CODEWORD MSB LSB | ORDER OF RECORDING | CODEWORD MSB LSB | ORDER OF RECORDING | CODEWORD MSB LSB |
|---|---|---|---|---|---|---|---|
| 0 | 1101110001 | 40 | 1000101110 | 80 | 0010001110 | 120 | 1101110001 |
| 1 | 1101110001 | 41 | 0010001110 | 81 | 1101110001 | 121 | 1000101110 |
| 2 | 1101110001 | 42 | 0010001110 | 82 | 1101110001 | 122 | 0010001110 |
| 3 | 1101110001 | 43 | 0010001110 | 83 | 1101110001 | 123 | 0010001110 |
| 4 | 1000101110 | 44 | 1101110001 | 84 | 1000101110 | 124 | 0010001110 |
| 5 | 0010001110 | 45 | 1101110001 | 85 | 0010001110 | 125 | 0010001110 |
| 6 | 0010001110 | 46 | 1101110001 | 86 | 0010001110 | 126 | 1101110001 |
| 7 | 0010001110 | 47 | 1101110001 | 87 | 0010001110 | 127 | 1101110001 |
| 8 | 1101110001 | 48 | 1000101110 | 88 | 0010001110 | 128 | 1101110001 |
| 9 | 1101110001 | 49 | 0010001110 | 89 | 1101110001 | 129 | 1101110001 |
| 10 | 1101110001 | 50 | 0010001110 | 90 | 1101110001 | 130 | 1000101110 |
| 11 | 1101110001 | 51 | 0010001110 | 91 | 1101110001 | 131 | 0010001110 |
| 12 | 1000101110 | 52 | 1101110001 | 92 | 1101110001 | 132 | 0010001110 |
| 13 | 0010001110 | 53 | 1101110001 | 93 | 1000101110 | 133 | 0010001110 |
| 14 | 0010001110 | 54 | 1101110001 | 94 | 0010001110 | 134 | 1101110001 |
| 15 | 0010001110 | 55 | 1101110001 | 95 | 0010001110 | 135 | 1101110001 |
| 16 | 1101110001 | 56 | 1000101110 | 96 | 0010001110 | 136 | 1101110001 |
| 17 | 1101110001 | 57 | 0010001110 | 97 | 1000101110 | 137 | 1101110001 |
| 18 | 1101110001 | 58 | 0010001110 | 98 | 0010001110 | 138 | 1101110001 |
| 19 | 1101110001 | 59 | 0010001110 | 99 | 0010001110 | 139 | 1000101110 |
| 20 | 1000101110 | 60 | 1101110001 | 100 | 0010001110 | | |
| 21 | 0010001110 | 61 | 1101110001 | 101 | 1101110001 | | |
| 22 | 0010001110 | 62 | 1101110001 | 102 | 1101110001 | | |
| 23 | 0010001110 | 63 | 1101110001 | 103 | 1101110001 | | |
| 24 | 1101110001 | 64 | 1000101110 | 104 | 1000101110 | | |
| 25 | 1101110001 | 65 | 0010001110 | 105 | 0010001110 | | |
| 26 | 1101110001 | 66 | 0010001110 | 106 | 0010001110 | | |
| 27 | 1101110001 | 67 | 0010001110 | 107 | 0010001110 | | |
| 28 | 1000101110 | 68 | 1101110001 | 108 | 1101110001 | | |
| 29 | 0010001110 | 69 | 1101110001 | 109 | 1101110001 | | |
| 30 | 0010001110 | 70 | 1101110001 | 110 | 1101110001 | | |
| 31 | 0010001110 | 71 | 1101110001 | 111 | 1101110001 | | |
| 32 | 1000101110 | 72 | 1000101110 | 112 | 1000101110 | | |
| 33 | 0010001110 | 73 | 0010001110 | 113 | 0010001110 | | |
| 34 | 0010001110 | 74 | 0010001110 | 114 | 0010001110 | | |
| 35 | 0010001110 | 75 | 0010001110 | 115 | 0010001110 | | |
| 36 | 1101110001 | 76 | 1101110001 | 116 | 1101110001 | | |
| 37 | 1101110001 | 77 | 1101110001 | 117 | 1101110001 | | |
| 38 | 1101110001 | 78 | 1101110001 | 118 | 1101110001 | | |
| 39 | 1101110001 | 79 | 1101110001 | 119 | 1101110001 | | |

FIG. 13

| ORDER OF RECORDING | CODEWORD MSB LSB | ORDER OF RECORDING | CODEWORD MSB LSB | ORDER OF RECORDING | CODEWORD MSB LSB | ORDER OF RECORDING | CODEWORD MSB LSB |
|---|---|---|---|---|---|---|---|
| 0 | 1101110001 | 40 | 0010001110 | 80 | 1101110001 | 120 | 1101110001 |
| 1 | 1101110001 | 41 | 0010001110 | 81 | 0010001110 | 121 | 1101110001 |
| 2 | 1101110001 | 42 | 1101110001 | 82 | 0010001110 | 122 | 1101110001 |
| 3 | 0010001110 | 43 | 1101110001 | 83 | 0010001110 | 123 | 0010001110 |
| 4 | 0010001110 | 44 | 1101110001 | 84 | 1101110001 | 124 | 0010001110 |
| 5 | 0010001110 | 45 | 0010001110 | 85 | 0010001110 | 125 | 0010001110 |
| 6 | 1101110001 | 46 | 0010001110 | 86 | 0010001110 | 126 | 1101110001 |
| 7 | 1101110001 | 47 | 1101110001 | 87 | 1101110001 | 127 | 1101110001 |
| 8 | 1101110001 | 48 | 1101110001 | 88 | 1101110001 | 128 | 1101110001 |
| 9 | 0010001110 | 49 | 0010001110 | 89 | 0010001110 | 129 | 0010001110 |
| 10 | 0010001110 | 50 | 0010001110 | 90 | 0010001110 | 130 | 0010001110 |
| 11 | 0010001110 | 51 | 1101110001 | 91 | 1101110001 | 131 | 0010001110 |
| 12 | 1101110001 | 52 | 1101110001 | 92 | 1101110001 | 132 | 1101110001 |
| 13 | 1101110001 | 53 | 1101110001 | 93 | 1101110001 | 133 | 1101110001 |
| 14 | 1101110001 | 54 | 0010001110 | 94 | 0010001110 | 134 | 1101110001 |
| 15 | 0010001110 | 55 | 0010001110 | 95 | 0010001110 | 135 | 0010001110 |
| 16 | 0010001110 | 56 | 1101110001 | 96 | 1101110001 | 136 | 0010001110 |
| 17 | 1101110001 | 57 | 1101110001 | 97 | 1101110001 | 137 | 0010001110 |
| 18 | 1101110001 | 58 | 1101110001 | 98 | 1101110001 | 138 | 1101110001 |
| 19 | 1101110001 | 59 | 0010001110 | 99 | 0010001110 | 139 | 1101110001 |
| 20 | 0010001110 | 60 | 0010001110 | 100 | 0010001110 | | |
| 21 | 0010001110 | 61 | 1101110001 | 101 | 1101110001 | | |
| 22 | 1101110001 | 62 | 1101110001 | 102 | 1101110001 | | |
| 23 | 1101110001 | 63 | 1101110001 | 103 | 1101110001 | | |
| 24 | 1101110001 | 64 | 0010001110 | 104 | 0010001110 | | |
| 25 | 0010001110 | 65 | 0010001110 | 105 | 0010001110 | | |
| 26 | 0010001110 | 66 | 1101110001 | 106 | 1101110001 | | |
| 27 | 1101110001 | 67 | 1101110001 | 107 | 1101110001 | | |
| 28 | 1101110001 | 68 | 0010001110 | 108 | 0010001110 | | |
| 29 | 0010001110 | 69 | 0010001110 | 109 | 0010001110 | | |
| 30 | 0010001110 | 70 | 1101110001 | 110 | 1101110001 | | |
| 31 | 1101110001 | 71 | 1101110001 | 111 | 1101110001 | | |
| 32 | 1101110001 | 72 | 1101110001 | 112 | 1101110001 | | |
| 33 | 0010001110 | 73 | 0010001110 | 113 | 0010001110 | | |
| 34 | 0010001110 | 74 | 0010001110 | 114 | 0010001110 | | |
| 35 | 1101110001 | 75 | 1101110001 | 115 | 1101110001 | | |
| 36 | 1101110001 | 76 | 1101110001 | 116 | 1101110001 | | |
| 37 | 1101110001 | 77 | 1101110001 | 117 | 1101110001 | | |
| 38 | 1101110001 | 78 | 1101110001 | 118 | 0010001110 | | |
| 39 | 0010001110 | 79 | 1101110001 | 119 | 0010001110 | | |

| ORDER OF RECORDING | CODEWORD MSB LSB | ORDER OF RECORDING | CODEWORD MSB LSB | ORDER OF RECORDING | CODEWORD MSB LSB | ORDER OF RECORDING | CODEWORD MSB LSB |
|---|---|---|---|---|---|---|---|
| 0 | 1000110111 | 40 | 0101011011 | 80 | 1010010100 | 120 | 1000110111 |
| 1 | 1010101000 | 41 | 0110100111 | 81 | 0111001000 | 121 | 1001011000 |
| 2 | 1010101000 | 42 | 1000110111 | 82 | 1011001000 | 122 | 1010101000 |
| 3 | 0111001000 | 43 | 1010100100 | 83 | 0101101011 | 123 | 0111001000 |
| 4 | 0101010111 | 44 | 1001101000 | 84 | 1000110111 | 124 | 0101101011 |
| 5 | 0110110111 | 45 | 0110110111 | 85 | 1010011000 | 125 | 1001011011 |
| 6 | 1000110011 | 46 | 0101011011 | 86 | 0111001000 | 126 | 1000110111 |
| 7 | 1010101011 | 47 | 1000110111 | 87 | 0101101011 | 127 | 1001011000 |
| 8 | 1010101000 | 48 | 1010010100 | 88 | 0111001000 | 128 | 1010010100 |
| 9 | 0111001000 | 49 | 1001101000 | 89 | 1011001000 | 129 | 0111001000 |
| 10 | 0101010111 | 50 | 1010101011 | 90 | 1000110111 | 130 | 0111001000 |
| 11 | 0101010011 | 51 | 0101011011 | 91 | 1010011000 | 131 | 1000110111 |
| 12 | 1000110111 | 52 | 1000110111 | 92 | 1001011011 | 132 | 1001101000 |
| 13 | 1010101000 | 53 | 0110110111 | 93 | 1011001000 | 133 | 1010011000 |
| 14 | 1010101000 | 54 | 1000110111 | 94 | 0101011011 | 134 | 1001010100 |
| 15 | 0111001000 | 55 | 1010100100 | 95 | 1010010100 | 135 | 1000110111 |
| 16 | 0101101011 | 56 | 1001101000 | 96 | 1001010100 | 136 | 0110110111 |
| 17 | 1010101011 | 57 | 0110100111 | 97 | 1000110111 | 137 | 0110100111 |
| 18 | 1000110111 | 58 | 1000110111 | 98 | 0110100111 | 138 | 1010010111 |
| 19 | 1010101000 | 59 | 0101011011 | 99 | 1011001000 | 139 | 1011001000 |
| 20 | 1001101000 | 60 | 1010100100 | 100 | 1010010100 | 140 | 1010011000 |
| 21 | 0111001000 | 61 | 1001101000 | 101 | 0111001000 | 141 | 0110101011 |
| 22 | 0101101011 | 62 | 0110100111 | 102 | 1010010100 | 142 | 1000110111 |
| 23 | 1000110111 | 63 | 1010101000 | 103 | 1001011000 | 143 | 1001011011 |
| 24 | 1001011011 | 64 | 1000110111 | 104 | 1010010100 | 144 | 1011001000 |
| 25 | 1010101000 | 65 | 0101011011 | 105 | 0111001000 | 145 | 1010101000 |
| 26 | 0111001000 | 66 | 1000110111 | 106 | 0111001000 | 146 | 0101101011 |
| 27 | 0111001000 | 67 | 1010100100 | 107 | 1000110111 | 147 | 1001101000 |
| 28 | 1010100100 | 68 | 0110100111 | 108 | 0101011011 | 148 | 0110110111 |
| 29 | 0101011011 | 69 | 1001011000 | 109 | 1000110111 | 149 | 1000110111 |
| 30 | 1000110111 | 70 | 0110110111 | 110 | 1010010100 | 150 | 0101011011 |
| 31 | 1010101011 | 71 | 1000110111 | 111 | 0111001000 | 151 | 1000110111 |
| 32 | 0101101011 | 72 | 1001101000 | 112 | 0111001000 | 152 | 1001010100 |
| 33 | 1001010100 | 73 | 0101011011 | 113 | 1001011000 | 153 | 1010010100 |
| 34 | 0110110111 | 74 | 1001101000 | 114 | 1010010100 | 154 | 1001010100 |
| 35 | 1001100111 | 75 | 1010101000 | 115 | 1000110111 | 155 | 1000110111 |
| 36 | 1000110111 | 76 | 1000110111 | 116 | 1010010100 | 156 | 0110110111 |
| 37 | 1010100100 | 77 | 1010011011 | 117 | 0111001000 | 157 | 0110100111 |
| 38 | 1010010100 | 78 | 0100110111 | 118 | 0101011011 | 158 | 1010010100 |
| 39 | 0111001000 | 79 | 1010011000 | 119 | 0110011011 | 159 | 1011001000 |
| | | | | | | 160 | 0110010111 |
| | | | | | | 161 | 0110100111 |
| | | | | | | 162 | 1000110111 |
| | | | | | | 163 | 1001101000 |
| | | | | | | 164 | 0110110111 |
| | | | | | | 165 | 0111001000 |
| | | | | | | 166 | 0110100111 |
| | | | | | | 167 | 0110011011 |
| | | | | | | 168 | 1000110111 |
| | | | | | | 169 | 1001100100 |
| | | | | | | 170 | 1010101000 |
| | | | | | | 171 | 0110101000 |
| | | | | | | 172 | 0111001011 |
| | | | | | | 173 | 1010011011 |
| | | | | | | 174 | 1001100100 |
| | | | | | | 175 | 1010010100 |
| | | | | | | 176 | 0111001000 |
| | | | | | | 177 | 0111001000 |
| | | | | | | 178 | 1011001000 |
| | | | | | | 179 | 1010101011 |
| | | | | | | 180 | 1000110111 |
| | | | | | | 181 | 1001100100 |
| | | | | | | 182 | 1001010100 |

FIG. 19

| $APT_2$ | $APT_1$ | $APT_0$ | MEANING |
|---|---|---|---|
| 0 | 0 | 0 | CONSUMER DIGITAL VCR |
| 0 | 0 | 1 | RESERVED |
| 0 | 1 | 0 | RESERVED |
| 0 | 1 | 1 | RESERVED |
| 1 | 0 | 0 | RESERVED |
| 1 | 0 | 1 | RESERVED |
| 1 | 1 | 0 | RESERVED |
| 1 | 1 | 1 | NO INFORMATION |

FIG. 20

| ORDER OF RECORDING | CODEWORD MSB         LSB |
|---|---|
| 0 | 0010011101 |
| 1 | 0110011001 |
| 2 | 0110010101 |
| 3 | 0010011101 |
| 4 | 0110011001 |
| 5 | 0110010101 |
| 6 | 0010011101 |
| 7 | 0110011001 |
| 8 | 0110010101 |

FIG. 21

| ORDER OF RECORDING | CODEWORD<br>MSB          LSB |
|---|---|
| 0 | 0111001000 |
| 1 | 0110011011 |
| 2 | 0110010111 |
| 3 | 1000110111 |
| 4 | 0110011011 |
| 5 | 0110010101 |
| 6 | 0111001000 |
| 7 | 1001100100 |
| 8 | 1001101000 |

FIG. 22

| ORDER OF RECORDING | CODEWORD<br>MSB          LSB |
|---|---|
| 0 | 0111001000 |
| 1 | 0110011011 |
| 2 | 0110010111 |
| 3 | 1000110111 |
| 4 | 1001100100 |
| 5 | 1001101000 |
| 6 | 0111001000 |
| 7 | 0110011011 |
| 8 | 0110010111 |

FIG. 23

| ORDER OF RECORDING | CODEWORD<br>MSB　　　LSB | ORDER OF RECORDING | CODEWORD<br>MSB　　　LSB | ORDER OF RECORDING | CODEWORD<br>MSB　　　LSB |
|---|---|---|---|---|---|
| 0 | 10001 01110 | 10 | 10001 01110 | 20 | 10001 01110 |
| 1 | 10001 01110 | 11 | 10001 01110 | 21 | 10001 01110 |
| 2 | 10001 01110 | 12 | 10001 01110 | 22 | 10001 01110 |
| 3 | 10001 01110 | 13 | 10001 01110 | 23 | 10001 01110 |
| 4 | 10001 01110 | 14 | 10001 01110 | 24 | 10001 01110 |
| 5 | 10001 01110 | 15 | 10001 01110 | 25 | 10001 01110 |
| 6 | 10001 01110 | 16 | 10001 01110 | 26 | 10001 01110 |
| 7 | 10001 01110 | 17 | 10001 01110 | 27 | 10001 01110 |
| 8 | 10001 01110 | 18 | 10001 01110 | | |
| 9 | 10001 01110 | 19 | 10001 01110 | | |

FIG. 24

| ORDER OF RECORDING | CODEWORD MSB          LSB | ORDER OF RECORDING | CODEWORD MSB          LSB | ORDER OF RECORDING | CODEWORD MSB          LSB |
|---|---|---|---|---|---|
| 0 | 0010001110 | 10 | 1101110001 | 20 | 1101110001 |
| 1 | 1101110001 | 11 | 1101110001 | 21 | 1101110001 |
| 2 | 1101110001 | 12 | 1101110001 | 22 | 1101110001 |
| 3 | 1101110001 | 13 | 1101110001 | 23 | 1000101110 |
| 4 | 1101110001 | 14 | 1000101110 | 24 | 0010001110 |
| 5 | 1000101110 | 15 | 0010001110 | 25 | 0010001110 |
| 6 | 0010001110 | 16 | 0010001110 | 26 | 0010001110 |
| 7 | 0010001110 | 17 | 0010001110 | 27 | 0010001110 |
| 8 | 0010001110 | 18 | 0010001110 | | |
| 9 | 0010001110 | 19 | 1101110001 | | |

FIG. 25

| ORDER OF RECORDING | CODEWORD MSB      LSB | ORDER OF RECORDING | CODEWORD MSB      LSB | ORDER OF RECORDING | CODEWORD MSB      LSB |
|---|---|---|---|---|---|
| 0 | 1101110001 | 10 | 1101110001 | 20 | 0010001110 |
| 1 | 0010001110 | 11 | 1101110001 | 21 | 0010001110 |
| 2 | 0010001110 | 12 | 1101110001 | 22 | 1101110001 |
| 3 | 0010001110 | 13 | 0010001110 | 23 | 1101110001 |
| 4 | 1101110001 | 14 | 0010001110 | 24 | 1101110001 |
| 5 | 1101110001 | 15 | 0010001110 | 25 | 0010001110 |
| 6 | 1101110001 | 16 | 1101110001 | 26 | 0010001110 |
| 7 | 0010001110 | 17 | 1101110001 | 27 | 0010001110 |
| 8 | 0010001110 | 18 | 1101110001 | | |
| 9 | 0010001110 | 19 | 0010001110 | | |

US 7,062,154 B2

MAGNETIC-TAPE RECORDING APPARATUS, MAGNETIC-TAPE RECORDING METHOD, MAGNETIC-TAPE FORMAT, AND RECORDING MEDIUM

BACKGROUND OF THE INVENTION

1. Field of the Invention

The present invention relates to magnetic-tape recording apparatuses and methods, magnetic-tape formats, and recording media, and more particularly, to a magnetic-tape recording apparatus and method, a magnetic-tape format, and a recording medium which allow high-quality video data to be recorded into a magnetic tape.

2. Description of the Related Art

Compression technologies have been advancing these days. Video data is compressed, for example, by a Digital Video (DV) method and recorded into a magnetic tape. The format therefor is specified as a DV format for commercial digital video tape recorders.

FIG. 1 shows the structure of one track in the conventional DV format. In the DV format, 24-to-25 conversion is first applied to video data, and then the data is recorded. The number of bits in each portion shown in FIG. 1 is obtained after 24-to-25 conversion.

The substantial zone of one track corresponds to a wrapping angle of 174 degrees of a magnetic tape. An overwrite margin 1,250 bits long is formed outside the zone of the track. The overwrite margin is for preventing data to be deleted from remaining after deletion.

The length of the zone of one track is 134,975 bits when a rotating head is rotated at a frequency of 60×1000/1001 Hz, and is 134,850 bits when the rotating head is rotated at 60 Hz.

In a track, an insert-and-track-information (ITI) sector, an audio sector, a video sector, and a sub-code sector are sequentially disposed in a direction in which the rotating head traces (in the direction from the left to the right in FIG. 1). A gap G1 is formed between the ITI sector and the audio sector, a gap G2 is formed between the audio sector and the video sector, and a gap G3 is formed between the video sector and the sub-code sector.

The ITI sector is 3,600 bits long. At the beginning therefor, a pre-amble 1,400 bits long used for generating a clock is formed. A start sync area (SSA) and a track information area (TIA) are next formed with a length of 1,920 bits. The SSA has a bit string (sync number) required for detecting the TIA position. The TIA includes information indicating a commercial DV format, information indicating an SP mode or an LP mode, and information indicating the pattern of a pilot signal in one frame. A post-amble 280 bits long is disposed next to the TIA.

The gap G1 is 625 bits long.

The audio sector is 11,550 bits long. A pre-amble is disposed at the first 400 bits thereof, and a post-amble is disposed at the last 500 bits thereof. Data (audio data) is disposed at the area therebetween, which is 10,650 bits long.

The gap G2 is 700 bits long.

The video sector is 113,225 bits long. A pre-amble is disposed at the first 400 bits thereof, and a post-amble is disposed at the last 925 bits thereof. Data (video data) is disposed at the area therebetween, which is 111,900 bits long.

The gap G3 is 1,550 bits long.

The sub-code sector is 3,725 bits long when the rotating head is rotated at a frequency of 60×1000/1001 Hz, and is 3,600 bits long when the rotating head is rotated at 60 Hz. A pre-amble is disposed at the first 1,200 bits thereof, and a post-amble is disposed at the last 1,325 bits (when the rotating head is rotated at a frequency of 60×1000/1001 Hz) or at the last 1,200 bits (when the rotating head is rotated at 60 Hz) thereof. Data (sub-code) is disposed at the area therebetween, which is 1,200 bits long.

In the DV format, the gaps G1 to G3 are formed between the ITI sector, the audio sector, the video sector, and the sub-code sector as described above, and in addition, a preamble and a post-amble are formed in each sector. Therefore, so-called overheads are long and a sufficient recording rate cannot be obtained for substantial data.

To record high-quality video data (hereinafter called high-definition (HD) video data), for example, a bit rate of about 25 Mbps is required. In the conventional recording method, the video rate corresponding to an MP@HL Moving Picture Expert Group (MPEG) method is at most about 24 Mbps except for the rate of search-image data. As a result, standard-quality video data (hereinafter called standard-definition (SD) video data) can be recorded, but it is impossible to compress and record HD video data by the MP@HL or an MP@H-14 method.

SUMMARY OF THE INVENTION

The present invention has been made in consideration of the above conditions. Accordingly, it is an object of the present invention to allow HD data to be recorded and reproduced.

The foregoing object is achieved in one aspect of the present invention through the provision of a magnetic-tape recording apparatus for recording digital data on a magnetic tape by a rotating head, including first obtaining means for obtaining first-group data, including video data, audio data, or search data; second obtaining means for obtaining second-group data, including sub-code data related to the first-group data; synthesizing means for synthesizing the first-group data and the second-group data such that they are continuous without any space disposed therebetween, on each of two sub-tracks formed with a gap sandwiched therebetween on a track in the magnetic tape; and sending means for sending data synthesized by the synthesizing means to the rotating head in order to record the data on the magnetic tape.

The video data may be high-quality video data compressed by an MP@HL or MP@H-14 method.

The synthesizing means may synthesize information indicating the type of the video signal recorded into the track such that the information indicating the type of the video signal is recorded before the first-group data in each sub-track.

The foregoing object is achieved in another aspect of the present invention through the provision of a magnetic-tape recording method for a magnetic-tape recording apparatus for recording digital data on a magnetic tape by a rotating head, including a first obtaining step of obtaining first-group data, including video data, audio data, or search data; a second obtaining step of obtaining second-group data, including sub-code data related to the first-group data; a synthesizing step of synthesizing the first-group data and the second-group data such that they are continuous without any space disposed therebetween, on each of two sub-tracks formed with a gap sandwiched therebetween on a track in the magnetic tape; and a sending step of sending data synthesized by a process in the synthesizing step to the rotating head in order to record the data on the magnetic tape.

The foregoing object is achieved in still another aspect of the present invention through the provision of a recording medium storing a computer-readable program for controlling a magnetic-tape recording apparatus which records digital data on a magnetic tape by a rotating head, the program including a first obtaining step of obtaining first-group data, including video data, audio data, or search data; a second obtaining step of obtaining second-group data, including sub-code data related to the first-group data; a synthesizing step of synthesizing the first-group data and the second-group data such that they are continuous without any space disposed therebetween, on each of two sub-tracks formed with a gap sandwiched therebetween on a track in the magnetic tape; and a sending step of sending data synthesized by a process in the synthesizing step to the rotating head in order to record the data on the magnetic tape.

The foregoing object is achieved in yet another aspect of the present invention through the provision of a format of a magnetic tape into which digital data is recorded by a rotating head, wherein first-group data, including video data, audio data, or search data, and second-group data, including sub-code data related to the first-group data, are disposed such that they are continuous without any space disposed therebetween, on each of two sub-tracks formed with a gap sandwiched therebetween on a track in the magnetic tape.

In the magnetic-tape recording apparatus, the magnetic-tape recording method, the program stored in the recording medium, and the magnetic-tape format according to the present invention, the first-group data and the second-group data are disposed such that they are continuous without any space disposed therebetween, on each of two sub-tracks formed with a gap sandwiched therebetween on a track in a magnetic tape.

The foregoing object is achieved in still yet another aspect of the present invention through the provision of a magnetic-tape recording apparatus for recording digital data on a magnetic tape by a rotating head, including first obtaining means for obtaining first-group data, including video data, audio data, or search data; second obtaining means for obtaining second-group data, including sub-code data related to the first-group data; third obtaining means for obtaining third-group data, including audio data for after-recording; synthesizing means for synthesizing the first-group data and the second-group data such that they are continuous without any space disposed therebetween and for synthesizing the third-group data so as to form a gap between the third-group data and the first-group data, on a track in the magnetic tape; and sending means for sending data synthesized by the synthesizing means to the rotating head in order to record the data on the magnetic tape.

The video data may be high-quality video data compressed by an MP@HL or MP@H-14 method.

The foregoing object is achieved in a further aspect of the present invention through the provision of a magnetic-tape recording method for a magnetic-tape recording apparatus for recording digital data on a magnetic tape by a rotating head, including a first obtaining step of obtaining first-group data, including video data, audio data, or search data; a second obtaining step of obtaining second-group data, including sub-code data related to the first-group data; a third obtaining step of obtaining third-group data, including audio data for after-recording; a synthesizing step of synthesizing the first-group data and the second-group data such that they are continuous without any space disposed therebetween and of synthesizing the third-group data so as to form a gap between the third-group data and the first-group data, on a track in the magnetic tape; and a sending step of sending data synthesized by a process in the synthesizing step to the rotating head in order to record the data on the magnetic tape.

The foregoing object is achieved in a still further aspect of the present invention through the provision of a recording medium storing a computer-readable program for controlling a magnetic-tape recording apparatus which records digital data on a magnetic tape by a rotating head, the program including a first obtaining step of obtaining first-group data, including video data, audio data, or search data; a second obtaining step of obtaining second-group data, including sub-code data related to the first-group data; a third obtaining step of obtaining third-group data, including audio data for after-recording; a synthesizing step of synthesizing the first-group data and the second-group data such that they are continuous without any space disposed therebetween and of synthesizing the third-group data so as to form a gap between the third-group data and the first-group data, on a track in the magnetic tape; and a sending step of sending data synthesized by a process in the synthesizing step to the rotating head in order to record the data on the magnetic tape.

The foregoing object is achieved in a yet further aspect of the present invention through the provision of a format of a magnetic tape into which digital data is recorded by a rotating head, wherein, on a track in the magnetic tape, first-group data, including video data, audio data, or search data, and second-group data, including sub-code data related to the first-group data, are recorded such that they are continuous without any space disposed therebetween, and third-group data, including audio data for after-recording, is recorded such that a gap is formed between the third-group data and the first-group data.

In the magnetic-tape recording apparatus, the magnetic-tape recording method, the program stored in the recording medium, and the magnetic-tape format according to the present invention, the first-group data and the second-group data are recorded such that they are continuous without any space disposed therebetween, and the third-group data is recorded such that a gap is formed between the first-group data and the third-group data.

BRIEF DESCRIPTION OF THE DRAWINGS

FIG. 11 is a view showing an example structure of the data of ITI pre-ambles shown in FIG. 10 in a track F0.

FIG. 12 is a view showing an example structure of the data of ITI pre-ambles shown in FIG. 10 in a track F1.

FIG. 13 is a view showing an example structure of the data of ITI pre-ambles shown in FIG. 10 in a track F2.

FIG. 14 is a view showing an example structure of the data of SSAs shown in FIG. 10 in a track F0.

FIG. 15 is a view showing an example structure of the data of SSAs shown in FIG. 10 in a track F1.

FIG. 16 is a view showing an example structure of the data of SSAs shown in FIG. 10 in a track F2.

FIG. 19 is a view showing the structure of the TIA shown in FIG. 10.

FIG. 20 is a view showing an example structure of the data of TIAs shown in FIG. 10 in a track F0.

FIG. 21 is a view showing an example structure of the data of TIAs shown in FIG. 10 in a track F1.

FIG. 22 is a view showing an example structure of the data of TIAs shown in FIG. 10 in a track F2.

FIG. 23 is a view showing an example structure of the data of ITI post-ambles shown in FIG. 10 in a track F0.

FIG. 24 is a view showing an example structure of the data of ITI post-ambles shown in FIG. 10 in a track F1.

FIG. 25 is a view showing an example structure of the data of ITI post-ambles shown in FIG. 10 in a track F2.

DESCRIPTION OF THE PREFERRED EMBODIMENTS

Figure 2:
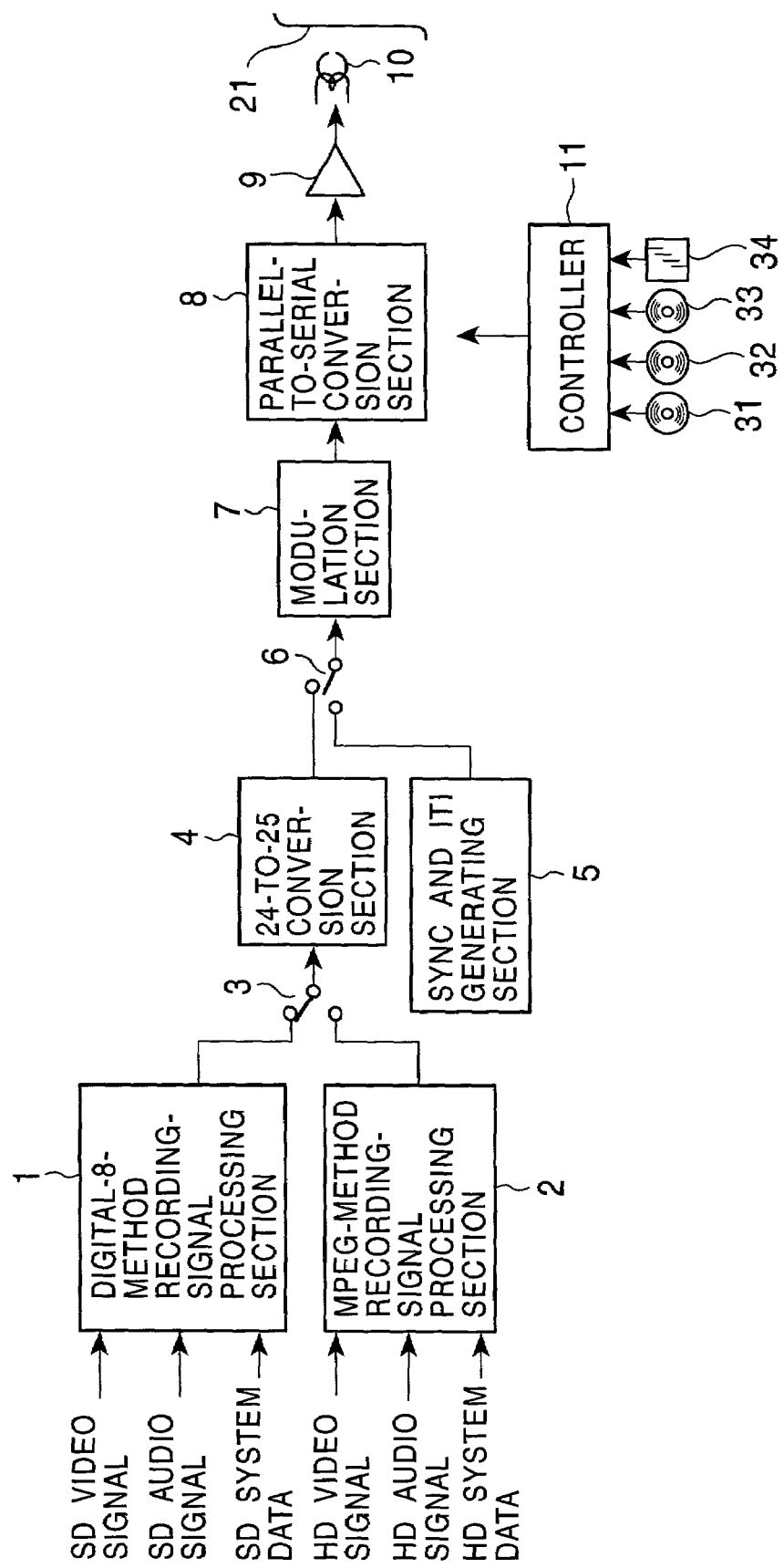
FIG. 2 is a block diagram showing an example structure of a recording system of a magnetic-tape recording and reproduction apparatus to which the present invention is applied.

FIG. 2 shows an example structure of a recording system of a magnetic-tape recording and reproduction apparatus to which the present invention is applied. An MPEG-method recording-signal processing section 2 compresses an input HD video signal by an MPEG method, such as an MP@HL or MP@H-14 method, and also compresses HD audio signal corresponding to the HD video signal, for example, by an MPEG audio compression method. A controller 11 inputs HD system data formed of auxiliary (AUX) data, sub-code data, and others to the MPEG-method recording-signal processing section 2.

The MPEG-method recording-signal processing section 2 also appropriately selects compressed video data, compressed audio data, and system data at a predetermined timing, adds an error detecting and correcting code and an ID, applies interleaving processing to 8 tracks (16 sub-tracks), and outputs to a 24-to-25 conversion section 4 through a switch 3.

A digital-8-method recording-signal processing section 1 compresses an SD video signal and SD audio signal corresponding thereto by a method specified by a digital-8 format. The digital-8-method recording-signal processing section 1 appropriately selects compressed SD video data, compressed SD audio data, and SD system data corresponding to the signals, adds an error-correcting code and an ID, and outputs to the 24-to-25 conversion section 4 through the switch 3.

The 24-to-25 conversion section 4 adds one redundant bit selected so as to enhance a pilot signal for tracking to convert data input in units of 24 bits to 25-bit data.

A sync and ITI generating section 5 generates sync data to be added to main data (FIG. 7) or to a sub code (FIG. 8), described later, and generates amble data.

A switch 6 is controlled by the controller 11 to select the output of the 24-to-25 conversion section 4 or the output of the sync and ITI generating section 5 and to output to a modulation section 7. The modulation section 7 modulates data input through the switch 6 by a method (the same method as for the digital-8 format) appropriate for recording into a magnetic tape 21, and outputs to a parallel-to-serial (P/S) conversion section 8.

The parallel-to-serial conversion section 8 converts input data from parallel data to serial data. An amplifier 9 amplifies data input from the parallel-to-serial conversion section 8, and sends it to a rotating head 10 mounted to a rotating drum (not shown) and rotated, to record into the magnetic tape 21.

Figure 3:
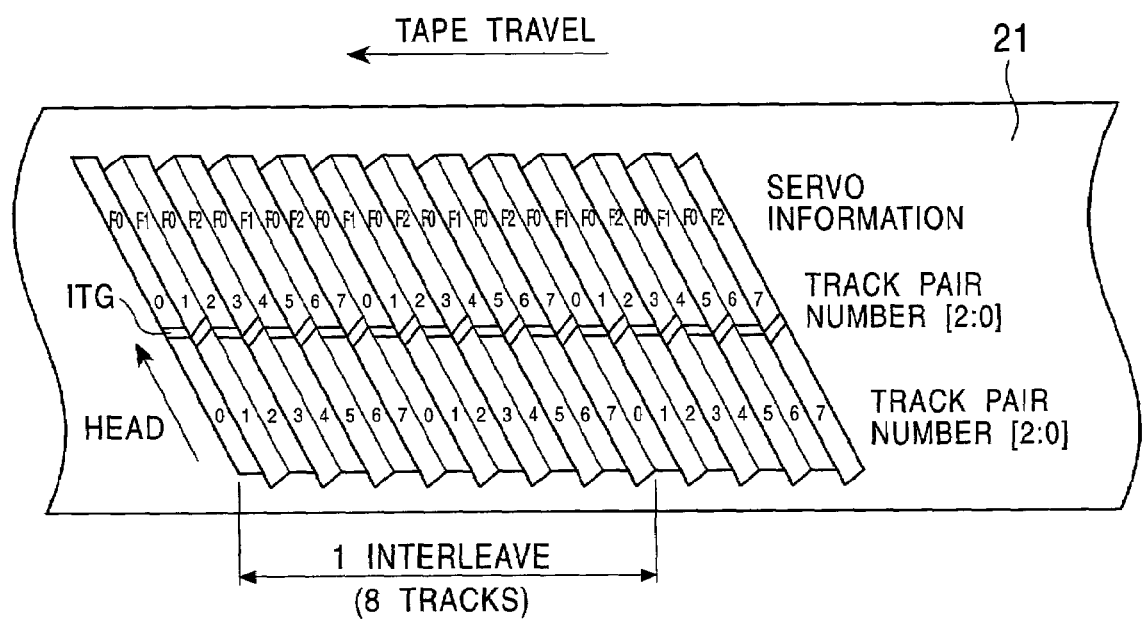
FIG. 3 is a view showing the track format of a magnetic tape shown in FIG. 2.

FIG. 3 shows the format of tracks formed by the rotating head 10 on the magnetic tape 21. The rotating head 10 traces on the magnetic tape 21 in the direction from the bottom right to the top left in the figure to form tracks at an angle against the longitudinal direction of the magnetic tape 21. The magnetic tape 21 is moved in the direction from the right to the left in the figure.

Each track is F0, F1, or F2 according to the type of a pilot signal recorded therein for tracking control. Tracks are formed in the order of F0, F1, F0, F2, F0, F1, F0, and F2.

In a track F0, neither a pilot signal having a frequency of f1 nor that having a frequency of f2 is recorded. In contrast, a pilot signal having a frequency of f1 is recorded in a track F1, and a pilot signal having a frequency of f2 is recorded in a track F2.

A track pattern having these frequency characteristics is the same as that in the digital-8 format. Therefore, a magnetic tape, a rotating head, a driving system, a demodulation system, and a control system for digital-8 commercial digital video tape recorders can be used in the present embodiment as they are.

A tape speed and a track pitch used in the present embodiment are the same as those used for the digital-8 format.

Each track is divided into two sub-tracks, and an inter-track gap (ITG) is formed between the sub-tracks.

Figure 4:
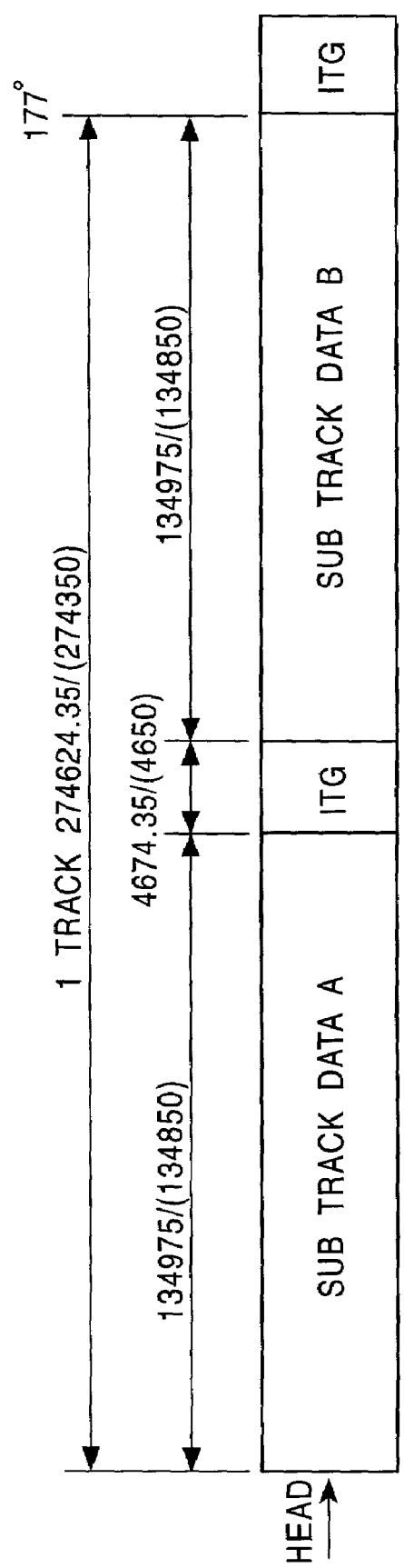
FIG. 4 is a view showing a sector arrangement in a track shown in FIG. 3.

FIG. 4 shows an example sector arrangement of each track. In FIG. 4, the number of bits indicates the length of each part, obtained after the 24-to-25 conversion. The length of one track is 274,624.35 bits when the rotating head 10 is rotated at a frequency of 60×1000/1001 Hz, and is 274,350 bits when the rotating head 10 is rotated at 60 Hz. The length of one track corresponds to a wrapping angle of 177 degrees of the magnetic tape 21. An ITG is formed thereafter.

The length of each sub-track is 134,975 bits when the rotating head 10 is rotated at a frequency of 60×1000/1001 Hz, and is 134,850 bits when the rotating head 10 is rotated at 60 Hz. The length of an ITG is 4,674.35 bits when the rotating head 10 is rotated at a frequency of 60×1000/1001 Hz, and is 4,650 bits when the rotating head 10 is rotated at 60 Hz.

This format is the same as the digital-8 format.

Figure 5:
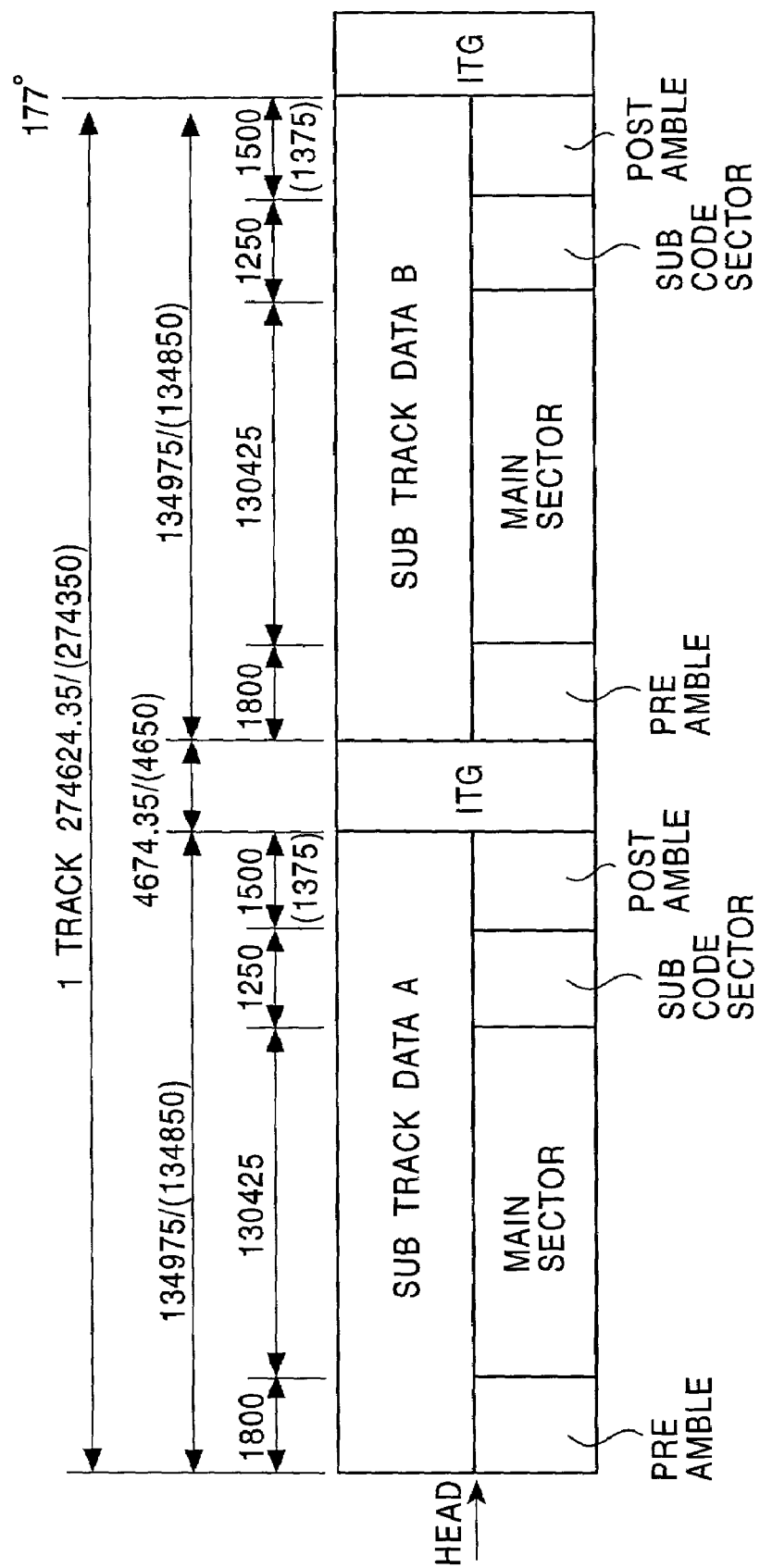
FIG. 5 is a view showing a detailed sector arrangement of a sub-track shown in FIG. 4.

FIG. 5 shows a detailed example structure of sectors inside two sub-tracks (sub-track A and sub-track B).

Figures 6, 7:
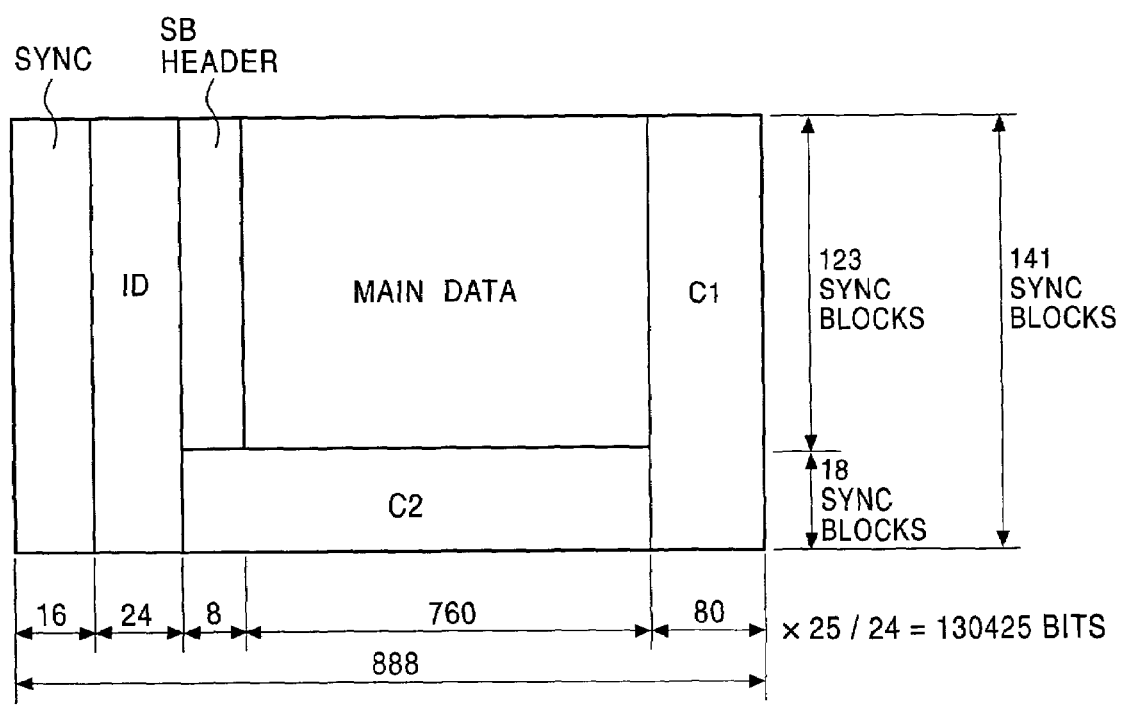
FIG. 6 is a view showing the patterns of a pre-amble and a post-amble shown in FIG. 5.
FIG. 7 is a view illustrating the structure of a main sector shown in FIG. 5.

In FIG. 5, the rotating head 10 traces on a track in the direction from the left to the right. At the beginning of each sub-track, a preamble 1,800 bits long is disposed. In this preamble, data required to generate a clock, such as that obtained by combining a pattern A and a pattern B shown in FIG. 6, is recorded. The pattern A has a 0-and-1 pattern reversed to that of the pattern B. Tracking patterns for tracks F0, F1, and F2 are made by appropriately combining the patterns. Run patterns shown in FIG. 6 are those obtained after the 24-to-25 conversion section 4 shown in FIG. 2 applies 24-to-25 conversion.

After the preamble having 1,800 bits, a main sector 130,425 bits long is disposed. FIG. 7 shows the structure of the main sector.

As shown in the figure, the main sector is formed of 141 sync blocks. Each sync block is 888 bits (111 bytes) long.

In each of 123 sync blocks, a 16-bit sync, a 24-bit ID, an 8-bit sync-block (SB) header, 760-bit main data, and a 80-bit parity C1 are disposed. The sync is generated by the sync and ITI generating section 5. The ID is added by the MPEG-method recording-signal processing section 2. The SB header includes identification information for identifying the type of the main data, such as audio data, video data, search video data, transport-stream data, and AUX data. The controller 11 sends the header data as a kind of system data.

The parity C1 is calculated by using the ID, the header, and the main data in each sync block and added by the MPEG-method recording-signal processing section 2.

Each of 18 sync blocks among the 141 sync blocks includes a sync, an ID, a parity C2, and a parity C1. The parity C2 is obtained by calculating the headers or the main data in the vertical direction in FIG. 7. This calculation is performed by the MPEG-method recording-signal processing section 2.

The total amount of data in the main sector is 888 bits ×141 sync blocks=125,208 bits. The total amount of data is 130,425 bits after the 24-to-25 conversion. The substantial maximum data rate is 760 bits×123 sync blocks×10 tracks× 30 Hz=28.044 Mbps when the rotating head 10 is rotated at 60 Hz if 10 sub-tracks are formed in one frame in average. This bit rate is sufficient for recording HD video data, compressed audio data, AUX data and search video data by the MP@HL or MP@H-14 method.

Figure 8:
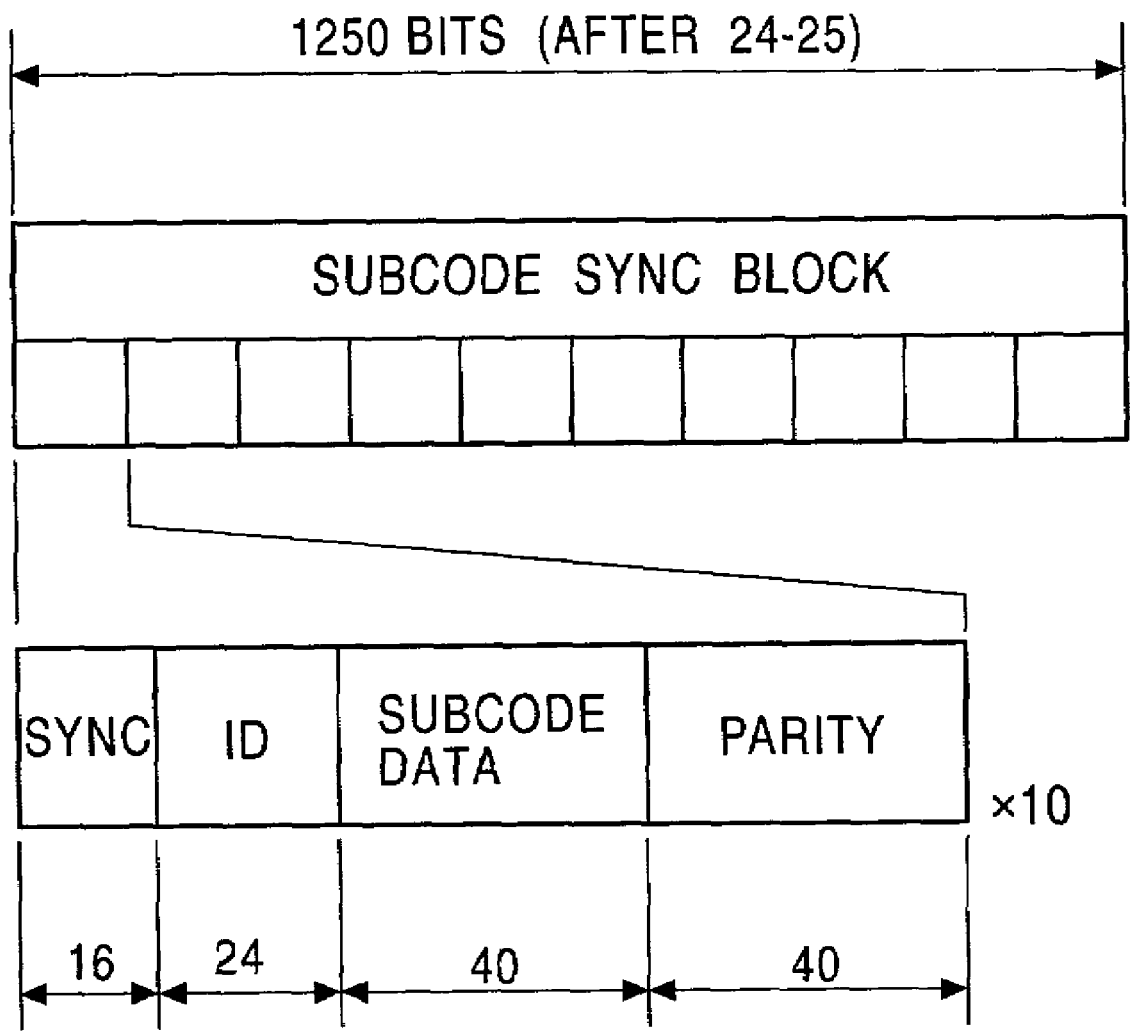
FIG. 8 is a view illustrating the structure of a sub-code sector shown in FIG. 5.

After the main sector, a sub-code sector 1250 bits long is disposed. FIG. 8 shows the structure of the sub-code sector.

The sub-code sector in one sub-track is formed of 10 sub-code sync blocks. One sub-code sync block is formed of a sync, an ID, sub-code data, and a parity.

At the beginning of each sub-code sync block in the sub-code sector 1250 bits long (after the 24-to-25 conversion) shown in FIG. 8, a 16-bit sync is disposed, whose length is obtained before 24-to-25 conversion. A 24-bit ID is disposed thereafter. The sync is added by the sync and ITI generating section 5. The ID is added by the MPEG-method recording-signal processing section 2.

After the ID code, 40-bit sub-code data is disposed. This sub-code data is sent from the controller 11, and includes, for example, a track number and a time-code number. After the sub-code data, a 40-bit parity is added. The parity is added by the MPEG-method recording-signal processing section 2.

24-to-25 conversion is applied to the data of the sub-code sync block, which is 120 bits long before 24-to-25 conversion, and the data has 125 bits (=120×25/24).

After the sub-code sector, a post-amble is disposed. The post amble is also recorded by combining the pattern A and the pattern B shown in FIG. 6. Its length is 1,500 bits when a synchronization is achieved at 60×1000/1001 Hz, and is 1,375 bits when a synchronization is achieved at 60 Hz.

Both the sub-track A and the sub-track B have the sector structure described above. An ITG, which serves as a gap to separate the sub-tracks, is disposed between the two sub-tracks.

The operation of the apparatus shown in FIG. 2 will be described next. An HD video signal is compressed together with search video data (thumbnail video data) by the MPEG-method recording-signal processing section 2, for example, by the MP@HL or MP@H-14 method. An audio signal is also compressed. HD system data, such as sub-code data, AUX data, and a header, is also sent from the controller 11 to the MPEG-method recording-signal processing section 2.

The MPEG-method recording-signal processing section 2 obtains compressed video data (including search video data), compressed audio data, or system data at a predetermined timing, and synthesizes the data.

The MPEG-method recording-signal processing section 2 adds a 24-bit ID to each sync block shown in FIG. 7 in the main sector. The MPEG-method recording-signal processing section 2 also calculates and adds a parity C1 shown in FIG. 7 for and to each sync block, and adds a parity C2 to each of 18 sync blocks among the 141 sync blocks, instead of the header and main data.

In addition, as shown in FIG. 8, the MPEG-method recording-signal processing section 2 adds a 24-bit ID to each sub-code sync block in the sub-code sector, and calculates and adds a 40-bit parity.

Further, the MPEG-method recording-signal processing section 2 records identification information indicating that data being recorded is that compressed by an MPEG method into the ID of the main sector shown in FIG. 7 and into the ID of the sub-code sector shown in FIG. 8.

Furthermore, the MPEG-method recording-signal processing section 2 holds data for 16 sub-tracks, and applies interleaving to the data within the 16 sub-tracks.

The 24-to-25 conversion section 4 converts data sent from the MPEG-method recording-signal processing section 2 through the switch 3 in units of 24 bits to 25-bit data. With this conversion, the pilot signals for tracking having frequencies of f1 and f2 have large magnitudes.

The sync and ITI generating section 5 adds a 16-bit synchronizing data (sync) to each sync block in the main sector, as shown in FIG. 7. The sync and ITI generating section 5 also adds 16-bit synchronizing data (sync) to each sub-code sync block in the sub-code sector, as shown in FIG. 8. In addition, the sync and ITI generating section 5 generates a run pattern (a combination of the pattern A and the pattern B) for a pre-amble or a post-amble shown in FIG. 6.

More specifically, the foregoing data is added (synthesized) when the controller 11 switches the switch 6 to selectively send the data output from the sync and ITI generating section 5 and the data output from the 24-to-25 conversion section 4 to the modulation section 7.

The modulation section 7 modulates input data by a method corresponding to the digital-8 format, and outputs to the parallel-to-serial conversion section 8. The parallel-to-serial conversion section 8 converts input data from parallel data to serial data, and sends it to the rotating head 10 through the amplifier 9. The rotating head 10 records input data into the magnetic tape 21.

When recording an SD video signal is instructed, the controller 11 switches the switch 3 to the side of the digital-8-method recording-signal processing section 1. As a result, an SD video signal, an SD audio signal, and SD system data processed by the digital-8-method recording-signal processing section 1 are sent to the 24-to-25 conversion section 4 through the switch 3. And then, in the same way as that described above, the signals and the data are recorded into the magnetic tape 21.

Figure 9:
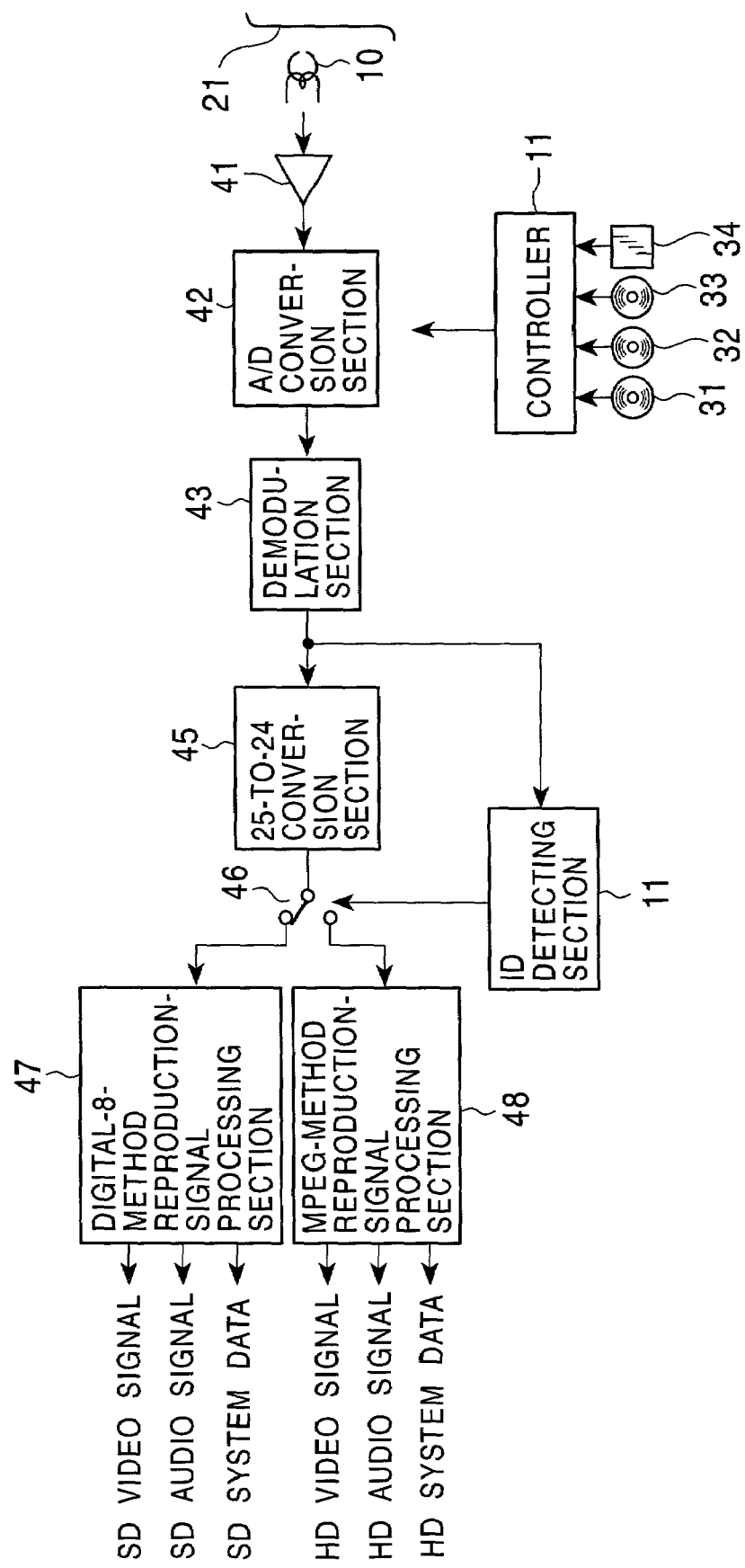
FIG. 9 is a block diagram showing an example structure of a reproduction system of the magnetic-tape recording and reproduction apparatus to which the present invention is applied.

FIG. 9 shows an example structure of a reproduction system for reproducing data recorded into the magnetic tape 21 as described above.

The rotating head 10 reads data recorded into the magnetic tape 21, and outputs it to an amplifier 41. The amplifier 41 amplifies an input signal, and sends it to an A/D conversion section 42. The A/D conversion section 42 converts an input signal from an analog signal to a digital signal, and sends it to a demodulation section 43. The demodulation section 43 demodulates data sent from the A/D conversion section 42 by a method corresponding to the modulation method used by the modulation section 7.

An ID detecting section 44 detects from data demodulated by the demodulation section 43 an ID in each sync block of the main sector shown in FIG. 7 and an ID in each sub-code sync block in the sub-code sector shown in FIG. 8, and switches a switch 46 correspondingly to identification information included therein to the side of a digital-8-method reproduction-signal processing section 47, or the side of an MPEG-method reproduction-signal processing section 48. A 25-to-24 conversion section 45 converts data sent from the demodulation section 43 from 25-bit data to 24-bit data correspondingly to the conversion performed by the 24-to-25 conversion section 4.

The operation of the reproduction system will be described next. The rotating head 10 reads data recorded into the magnetic tape 21, and the amplifier 41 amplifies it and sends it to the A/D conversion section 42. The A/D conversion section 42 converts an input analog signal to a digital signal, and sends it to the demodulation section 43. The demodulation section 43 demodulates input data by a method corresponding to the modulation method used by the modulation section 7 shown in FIG. 2.

The output of the A/D conversion section 42 is also sent to a servo circuit (not shown). The data (FIG. 6) of the pattern A and the pattern B recorded in the pre-amble and the post-amble are read in the servo circuit to generate pilot signals for tracking, and tracking control is executed.

The 25-to-24 conversion section 45 converts data demodulated by the demodulation section 43 from 25-bit data to 24-bit data.

The ID detecting section 44 detects from data output from the demodulation section 43 identification information included in IDs in the main sector shown in FIG. 7 or IDs in the sub-code sector shown in FIG. 8. According to the result of identification, when data being read is the data of an HD video signal, the ID detecting section 44 switches the switch 46 to the side of the MPEG-method reproduction-signal processing section 48, and sends data output from the 25-to-24 conversion section 45 to the MPEG-method reproduction-signal processing section 48. When data being read is the data of a digital-8-method SD video signal, the switch 46 is switched to the upper side in FIG. 9, and the data output from the 25-to-24 conversion section 45 is sent to the digital-8-method reproduction-signal processing section 47.

The MPEG-method reproduction-signal processing section 48 stores data for 16 tracks, applies deinterleaving, and achieves error-correcting processing with the use of the parities C1 and C2 of the main sector shown in FIG. 7. The MPEG-method reproduction-signal processing section 48 also detects an SB header in the main sector to determine whether data included in each sync block is audio data, video data, AUX data, or search video data.

In addition, the MPEG-method reproduction-signal processing section 48 uses a parity of the sub-code sector shown in FIG. 8 to apply error-correcting processing to sub-code data, and detects an ID to determine the type of the sub-code data. With this operation, it is determined whether the sub-code data indicates a track number or a time-code number.

The MPEG-method reproduction-signal processing section 48 decompresses video data by a method corresponding to the compression method used by the MPEG-method recording-signal processing section 2 shown in FIG. 2, and outputs as a video signal.

In the same way, audio data is decompressed by a method corresponding the compression method used by the MPEG-method recording-signal processing section 2 shown in FIG. 2, and output as an audio signal.

The MPEG-method reproduction-signal processing section 48 outputs AUX data and sub-code data which have been error-corrected, to the controller 11.

The digital-8-method reproduction-signal processing section 47 decompresses data input through the switch 46 by the digital-8 method, and output as an SD video signal and an SD audio signal. SD system data corresponding thereto is sent to the controller 11.

Figure 10:
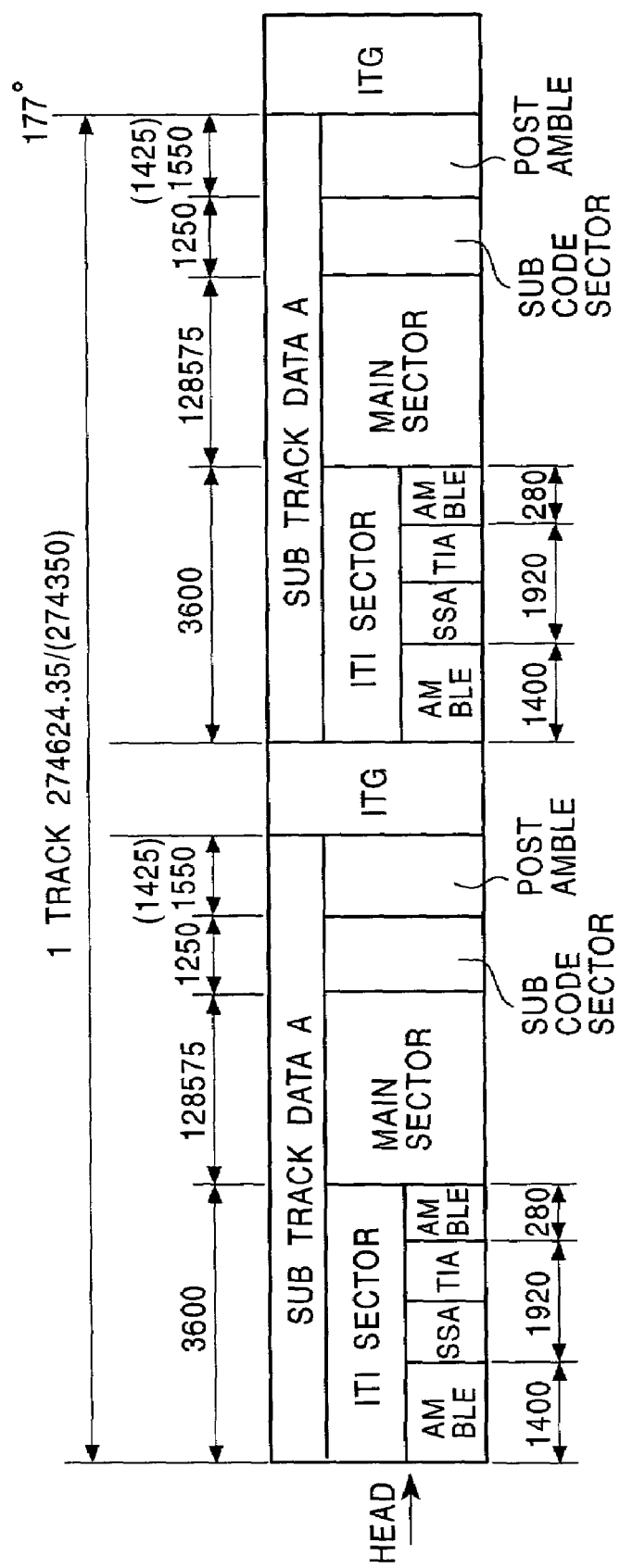
FIG. 10 is a view showing another track format of the magnetic tape shown in FIG. 2.

FIG. 10 shows another example arrangement of sectors in a track. Also in this case, one track is divided into two sub-tracks. The length of each sub-track and that of an ITG disposed between sub-tracks are the same as those shown in FIG. 5.

Figure 1:
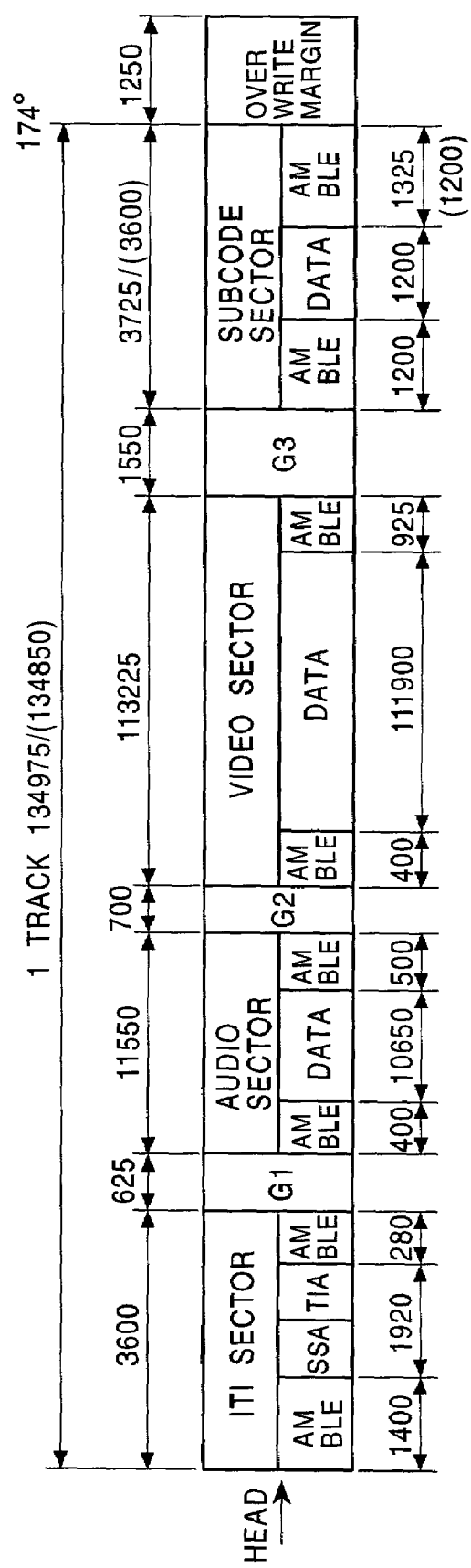
FIG. 1 is a view showing the structure of track sectors in a DV format.

In FIG. 10, the rotating head 10 traces on a track in the direction from the left to the right. At the beginning of each sub-track, an ITI sector 3,600 bits long, having the same format as the ITI sector of the DV format shown in FIG. 1 is disposed. At the beginning of the ITI sector, an ITI pre-amble 1,400 bits long is disposed. An ITI pre-amble has data shown in FIG. 11 in a track F0, has data shown in FIG. 12 in a track F1, and has data shown in FIG. 13 in a track F2.

Figure 14:
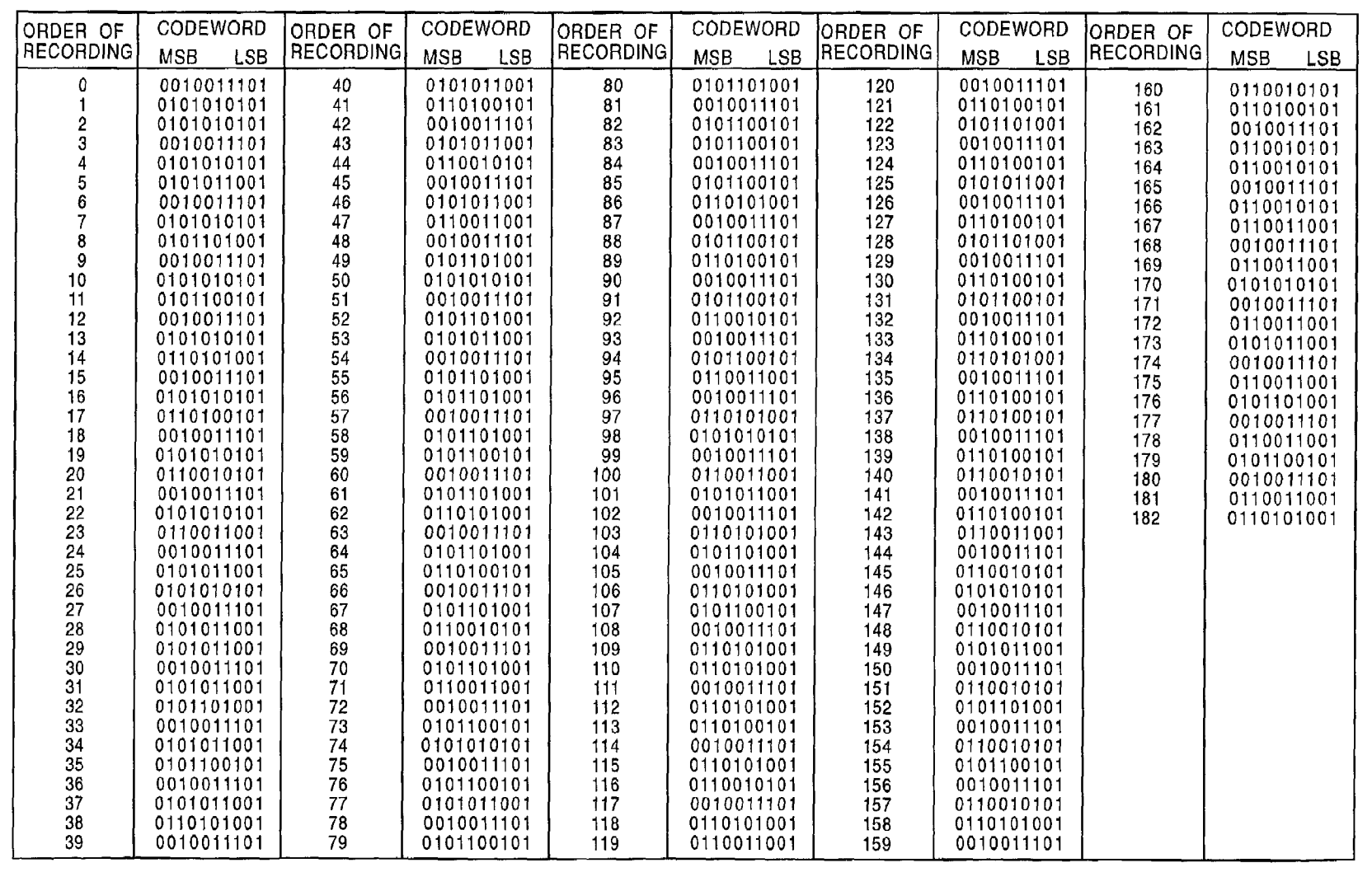
Figure 15:
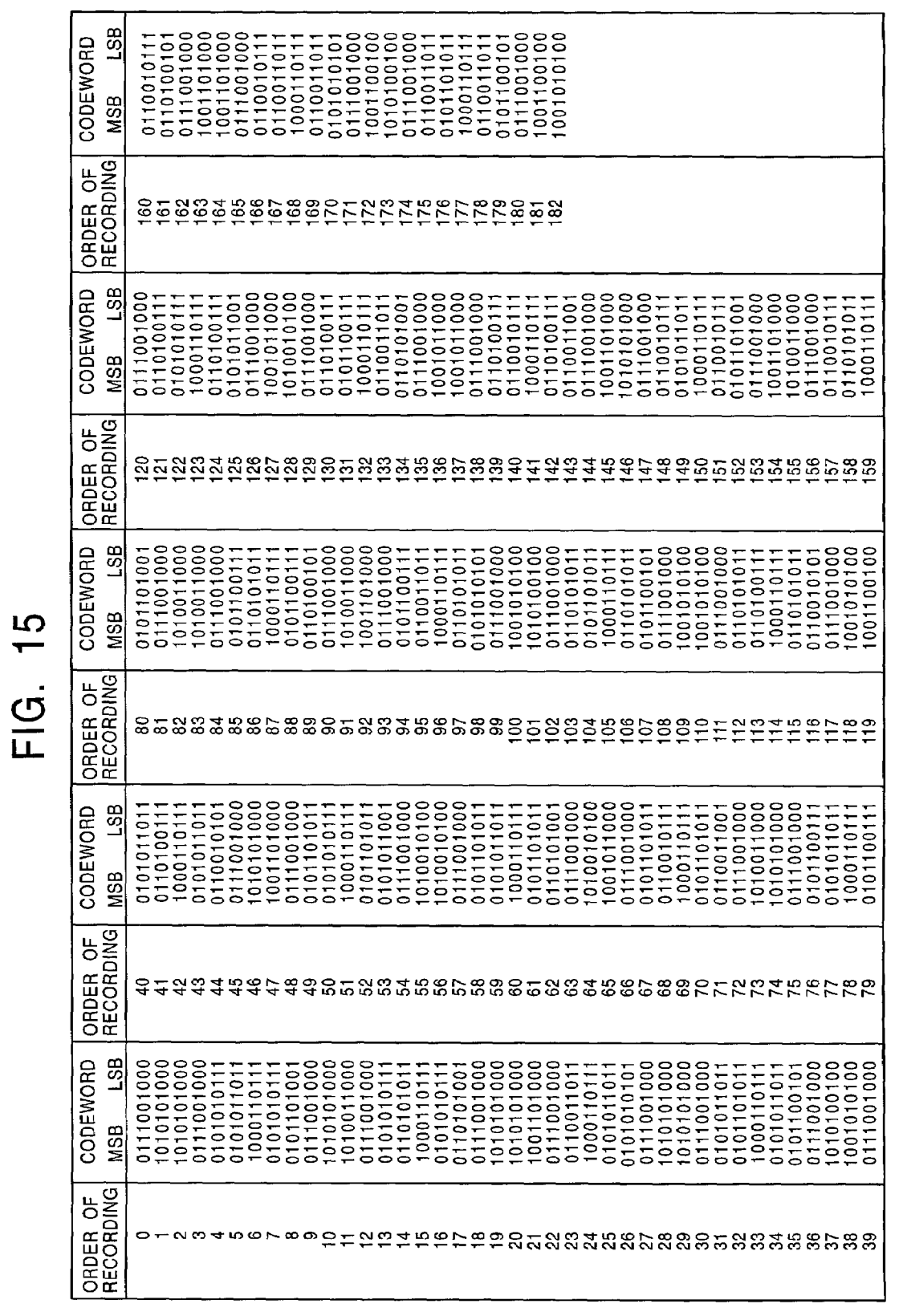

Following the ITI pre-amble, an SSA 1,830 bits long is disposed. An SSA has data shown in FIG. 14 in a track F0, has data shown in FIG. 15 in a track F1, and has data shown in FIG. 16 in a track F2.

The start of a TIA, following the SSA, is detected by using the SSA.

Figures 17, 18:
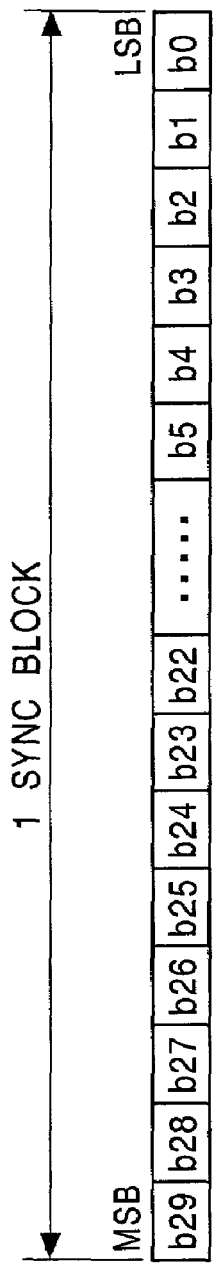
FIG. 17 is a view showing the structure of a sync block in a TIA shown in FIG. 10.
FIG. 18 is a view showing the track information of the TIA shown in FIG. 10.

Following the SSA, an TIA 90 bits long is disposed. The TIA is formed of three sync blocks. Each sync block is formed of 30 bits, b29 to b0, as shown in FIG. 17. The three sync blocks have the same data. Therefore, the same data is substantially recorded in the TIA three times.

Among the bits b29 to b0 in each sync block, data shown in FIG. 18 is disposed at bits b27 to b22 and bits b17 to b12.

More specifically, APT2 is disposed at bits b12 and b13, APT1 is disposed at bits b14 and b15, and APT0 is disposed at bits b16 and b17.

By APT2, APT1, and APT0, the type of data recorded in a track is indicated in the DV format, as shown in FIG. 19. For example, when APT2, APT1, and APT0 are all zero, it means that data for commercial digital video cassette recorders is recorded in the track, that is, data having the DV format is recorded. When APT2, APT1, and APT0 are all 1, it means that data has not been recorded in the track. Therefore, when it is determined that APT2, APT1, and APT0 are all 1, a magnetic-tape recording and reproduction apparatus for the DV format substantially operates so as not to read data from the magnetic tape.

In the present embodiment, as shown in FIG. 18, 1's are recorded in APT2, APT1, and APT0. As a result, when a magnetic-tape reproduction apparatus for the DV format attempts to read the magnetic tape 21 shown in FIG. 2, reading is not executed. In contrast, when a magnetic-tape recording and reproduction apparatus for recording and reproducing the data of an HD video signal reads the magnetic tape 21, if it is determined that APT2, APT1, and APT0 have all 1's, reading processing is executed for the magnetic tape since it is deemed that the data of an HD video signal has been recorded.

As shown in FIG. 18, TP1 is recorded in bits b22 and b23, and TP0 is recorded in bits b24 and b25. In the DV format, when TP1 is 1 and TP0 is 1, it means that the track pitch is set to track pitch 0 for the SP mode; when TP1 is 1 and TP0 is 0, it means that the track pitch is set to track pitch 1 for the LP mode; when TP1 is 0 and TP0 is 1, it means that the track pitch is set to track pitch 2; and when TP1 is 0 and TP0 is 0, it means that the track pitch is set to track pitch 3. In the present invention, TP1 and TP0 have the same meaning as in the DV format.

In the case shown in FIG. 18, since TP1 is 1 and TP0 is 1, it is specified that the SP mode has been selected.

PF0 is recorded in a bit b26, and PF1 is recorded in a bit b27. PF0 and PF1 indicate a pilot frame; a value of 0 indicates pilot frame 0; and a value of 1 indicates pilot frame 1. Pilot frame 0 means that a track F0 and a track F1 are disposed in that order as the first two tracks in 10 tracks constituting one frame. Pilot frame 1 means that a track F0 and a track F2 are disposed in that order.

In other words, as described by referring to FIG. 3, tracks are formed in the order of F0, F1, F0, F2, F0, F1, F0, and F2. In the commercial DV format, since one frame is formed of 10 tracks, when first two tracks are formed as a track F0 and a track F1 in a predetermined frame, the first two tracks of the next frame are formed as a track F0 and a track F2. The pilot frame indicates which track pattern is used in a frame.

The TIA having three sync blocks (90 bits long), each sync block being formed of the bits b29 to b0 shown in FIG. 17, has data shown in FIG. 20 in a track F0, has data shown in FIG. 21 in a track F1, and has data shown in FIG. 22 in a track F2.

Following the TIA, as shown in FIG. 10, a post-amble 280 bits long is disposed. This post-amble has data shown in FIG. 23 in a track F0, has data shown in FIG. 24 in a track F1, and has data shown in FIG. 25 in a track F2.

The foregoing ITI-sector data is generated by the sync and ITI generating section 5.

Figure 26:
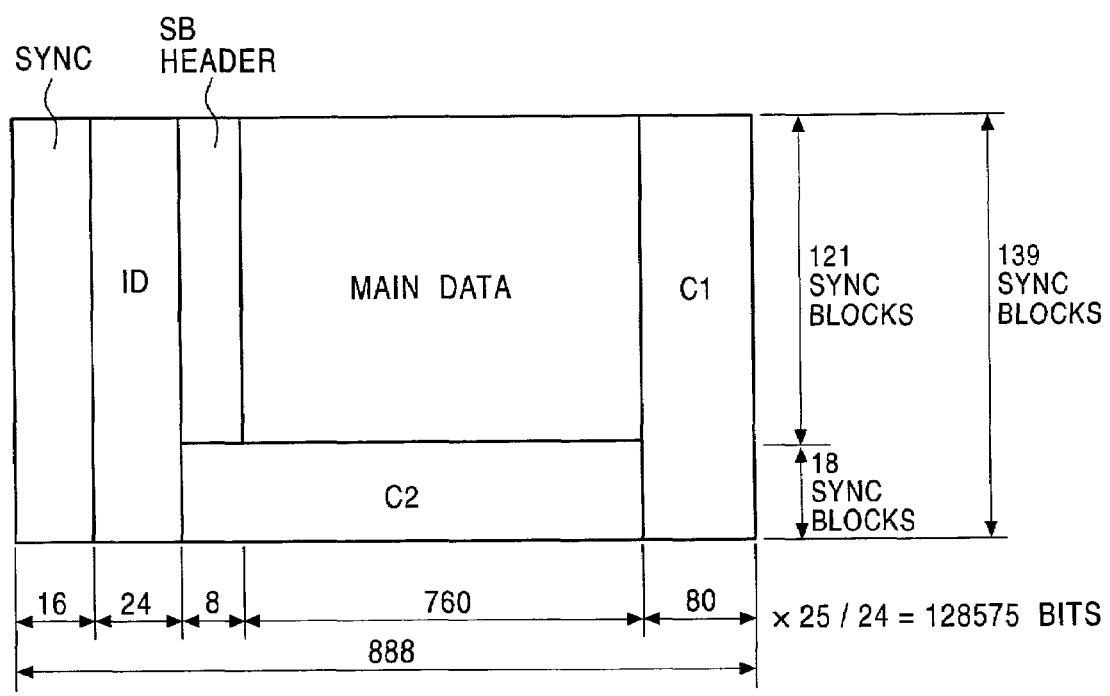
FIG. 26 is a view illustrating the structure of a main sector shown in FIG. 10.

After the post-amble having 280 bits in the ITI sector, a main sector 128,575 bits long is disposed. FIG. 26 shows the structure of the main sector.

As shown in the figure, the main sector is formed of 139 sync blocks. Each sync block is 888 bits (111 bytes) long.

In each of 121 sync blocks, a 16-bit sync, a 24-bit ID, an 8-bit sync-block (SB) header, 760-bit main data, and a 80-bit parity C1 are disposed. The sync is generated by the sync and ITI generating section 5. The ID is added by the MPEG-method recording-signal processing section 2. The SB header includes identification information for identifying the type of the main data, such as audio data, video data, search video data, transport-stream data, and AUX data. The controller 11 sends the SB-header data as a kind of system data.

The parity C1 is calculated by using the ID, the SB header, and the main data in each sync block and added by the MPEG-method recording-signal processing section 2.

Each of 18 sync blocks among the 139 sync blocks includes a sync, an ID, a parity C2, and a parity C1. The parity C2 is obtained by calculating the SB headers or the main data in the vertical direction in FIG. 26. This calculation is performed by the MPEG-method recording-signal processing section 2.

The total amount of data in the main sector is 888 bits×139 sync blocks=123,432 bits. The total amount of data is 128,575 bits after the 24-to-25 conversion. The substantial maximum data rate is 760 bits×121 sync blocks×10 tracks×30 Hz=27.588 Mbps when the rotating head 10 is rotated at 60 Hz if 10 sub-tracks are formed in one frame in average. This bit rate is sufficient for recording HD video data, compressed audio data, AUX data and search video data by the MP@HL or MP@H-14 method.

After the main sector, a sub-code sector 1,250 bits long is disposed. The structure of the sub-code sector is the same as that shown in FIG. 5 (FIG. 8).

After the sub-code sector, a post-amble is disposed. The data of the pattern A and the pattern B shown in FIG. 6, required for generating a clock, is combined and recorded in the post-amble in the same way as in the pre-amble.

Figure 27:
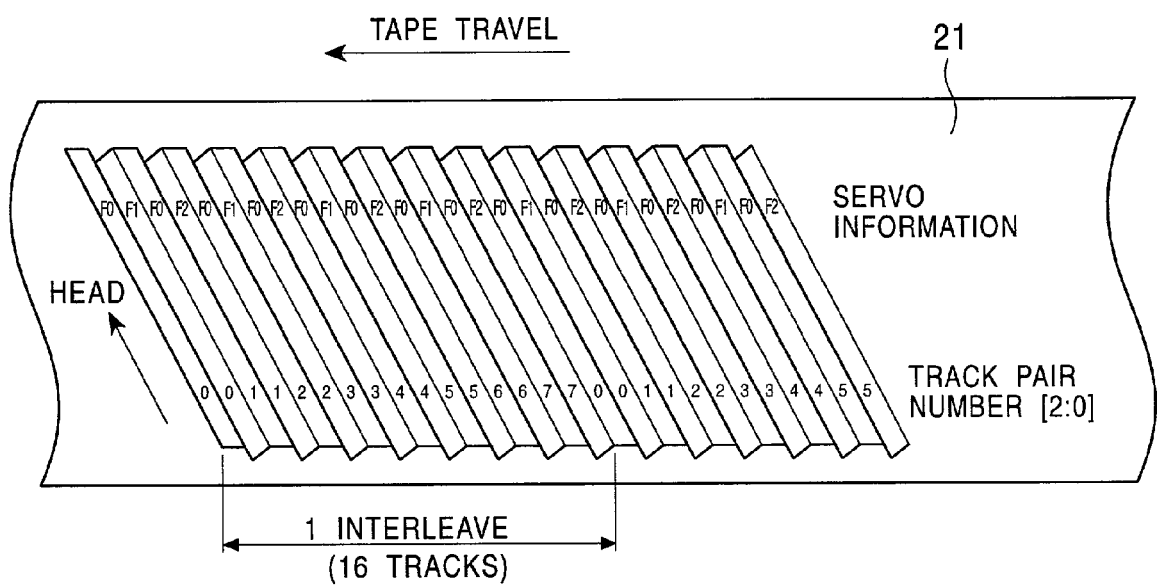
FIG. 27 is a view showing still another track format of the magnetic tape shown in FIG. 2.
Figure 28:
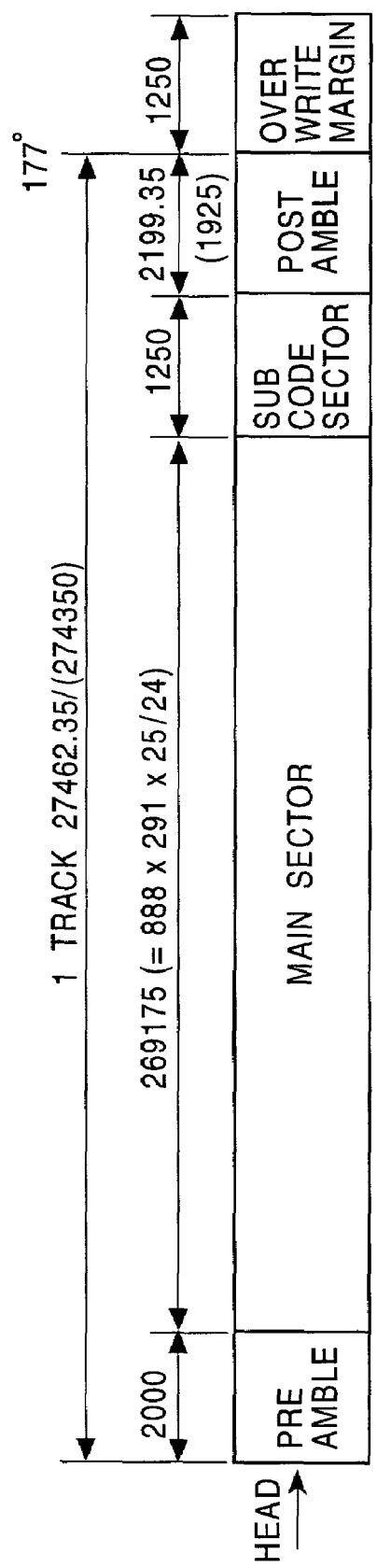
FIG. 28 is a view showing a sector arrangement in a track shown in FIG. 27.

FIG. 27 shows still another example structure of tracks. In the case shown in FIG. 27, interleaving is applied to 16 tracks. In this example structure, tracks are not divided into sub-tracks and are used as they are. FIG. 28 shows a detailed sector structure in a track.

As shown in the figure, at the beginning of the track, a pre-amble 2,000 bits long is disposed. In this pre-amble, data obtained by combining the pattern A and the pattern B shown in FIG. 6 is recorded.

Figure 29:
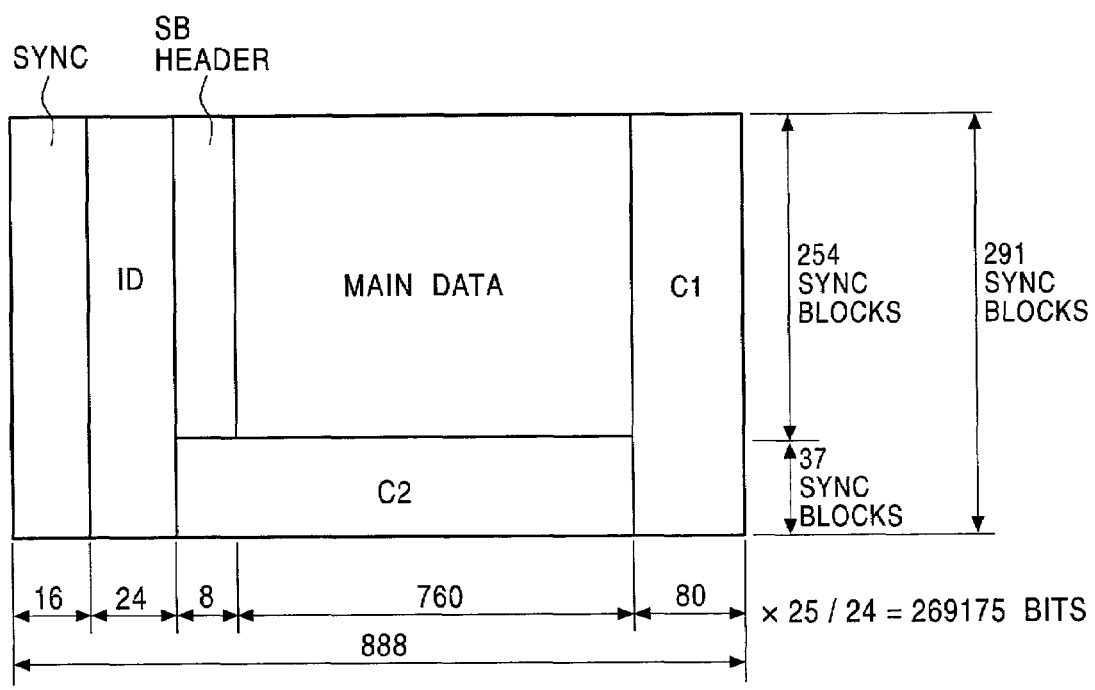
FIG. 29 is a view illustrating the structure of a main sector shown in FIG. 28.

After the pre-amble, a main sector 269,175 bits long is disposed. FIG. 29 shows the structure of the main sector.

The basic structure thereof is the same as in the case shown in FIG. 7. One track is formed of 291 sync blocks. Among them, main data is disposed in 254 sync blocks, and a parity C2 is disposed in each of the remaining 37 sync blocks.

In this case, the maximum recording data rate is 760 bits×254 sync blocks×5 tracks×30 Hz (frame) 28.956 Mbps at 60-Hz synchronization.

Figure 30:
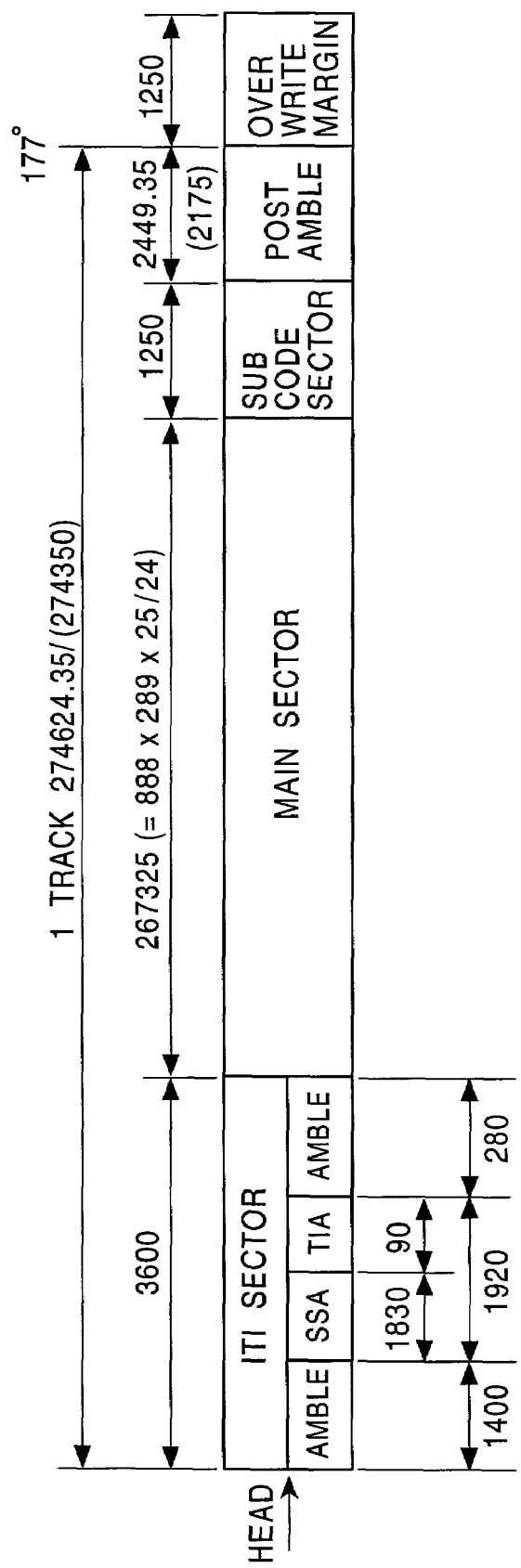
FIG. 30 is a view showing another sector arrangement in the track shown in FIG. 27.

FIG. 30 shows another example structure of sectors in the track formed as shown in FIG. 27. In this example structure, an ITI sector 3,600 bits long is disposed at the beginning. The structure of the ITI sector is the same as that shown in FIG. 10. An ITI pre-amble 1,400 bits long, an SSA 1,830 bits long, a TIA 90 bits long, and an ITI post-amble 280 bits long are disposed.

Figure 31:
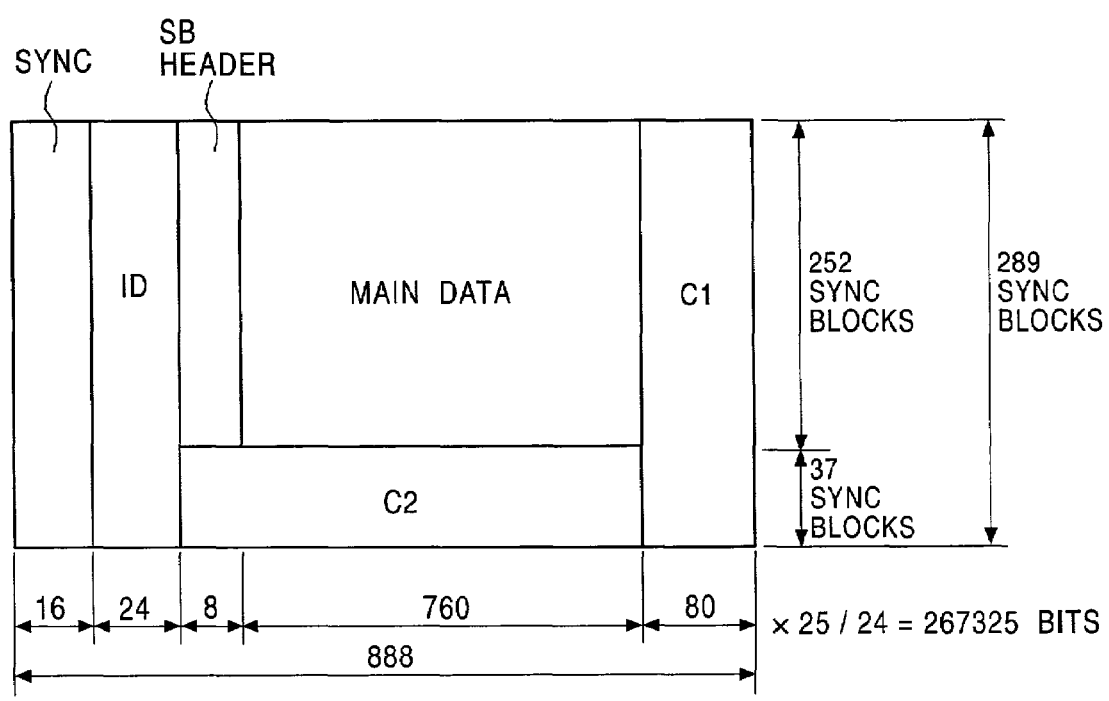
FIG. 31 is a view illustrating the structure of a main sector shown in FIG. 30.

After the ITI sector, a main sector 267,325 bits long is disposed. FIG. 31 shows the structure of the main sector.

As shown in the figure, basically, the structure of the main sector is also the same as in the case shown in FIG. 7. One track is formed of 289 sync blocks. Among them, main data is disposed in 252 sync blocks, and a parity C2 is disposed in each of the remaining 37 sync blocks.

Therefore, in this case, the maximum recording data rate is 720 bits×252 sync blocks×5 tracks×30 Hz (frame)=28.728 Mbps at 60-Hz synchronization.

After the main sector, a sub-code sector 1,250 bits long is disposed. The structure of the sub-code sector is the same as that shown in FIG. 8.

After the sub-code sector, a post-amble 2449.35 bits long is disposed. The length thereof is 2,175 bits at 30-Hz synchronization. Data obtained by combining the pattern A and the pattern B is recorded in the post-amble in the same way as in the case shown in FIG. 6.

Figure 32:
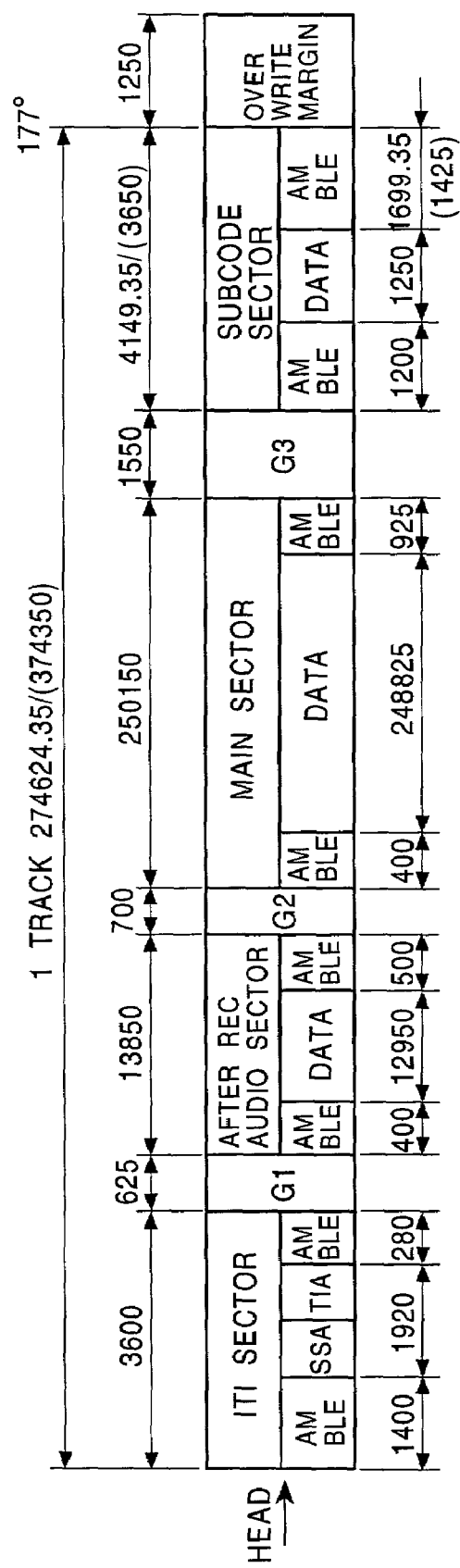
FIG. 32 is a view showing still another sector arrangement in the track shown in FIG. 27.

FIG. 32 shows yet another example structure of sectors in the track formed as shown in FIG. 27. In this example structure, an ITI sector 3,600 bits long is disposed at the beginning. The structure of the ITI sector is the same as that shown in FIG. 10 and FIG. 30.

Following the ITI sector, an audio sector for after-recording 13,850 bits long is disposed through a gap G1 625 bits long. The audio sector for after-recording is formed of a 400-bit pre-amble, a 12,950-bit data section, and a 500-bit post-amble. In the data section 12,950 bits long, audio data for after-recording is disposed.

In other words, in the cases which have been described so far, video data, audio data, or AUX data is selectively disposed in the main sector, and a sub-code sector is disposed so as to follow the main sector (without a gap therebetween). Therefore, in the cases, after-recording is basically difficult to achieve. In the case shown in FIG. 32, however, since gaps are formed, after-recording is made possible.

After the audio sector for after-recording, a main sector 250,150 bits long is disposed through a gap G2 700 bits long. At the beginning of the main sector, a 400-bit pre-amble is disposed, followed by a data section 248,825 bits long, and then, followed by a 925-bit post-amble.

In the data section, video data, audio data not for after-recording, and AUX data are selectively disposed.

After the main sector, a sub-code sector 4149.35 bits long is disposed through a gap G3 1,550 bits long. The length of the sub-code sector is 3,650 bits at a 30-Hz synchronization. At the beginning of the sub-code sector, a 1,200-bit pre-amble is disposed. And then, a 1,250-bit data section is disposed, and a post-amble is formed, which is 1699.35 bits long when the rotating head is synchronized at 60×1000/1001 Hz, and which is 1,425 bits long when the rotating head is synchronized at 60 Hz. Sub-codes are disposed in the 1,250-bit data section.

Figure 33:
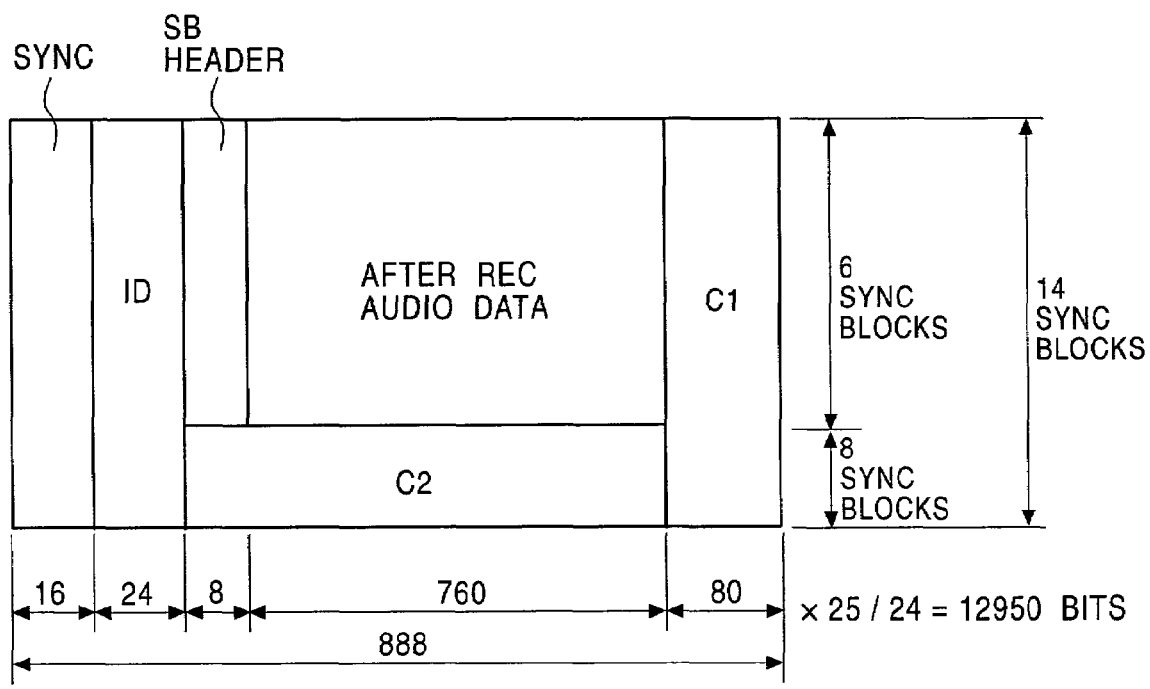
FIG. 33 is a view illustrating the structure of an audio sector for after-recording shown in FIG. 32.

FIG. 33 shows the structure of the data section for audio data for after-recording. One track has 14 sync blocks. Among them, six sync blocks include audio data for after-recording. Each of the remaining eight sync blocks has a parity C2. Therefore, the maximum recording data rate is 720 bits×6 sync blocks×5 tracks×30 Hz (frame)=684 Kbps at a 60-Hz synchronization.

Figure 34:
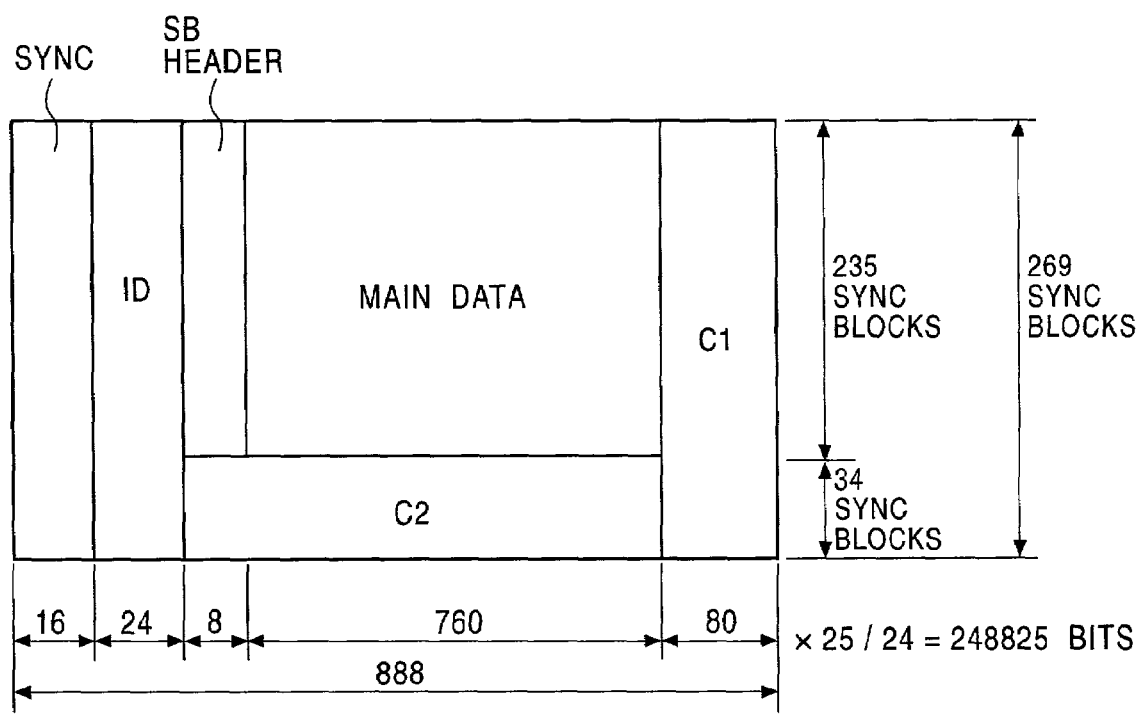
FIG. 34 is a view illustrating the structure of a main sector shown in FIG. 32.

FIG. 34 shows the structure of the data section in the main sector. One track includes 269 sync blocks. Among them, 235 sync blocks have main data. Each of the remaining 34 sync blocks has a parity C2.

In this case, the maximum recording rate is 760 bits×235 sync blocks×5 tracks×30 Hz (frame)=26.790 Mbps at a 60-Hz synchronization.

In the above embodiments, as the components in the recording system shown in FIG. 2 except the MPEG-method recording-signal processing section 2, more specifically, as the digital-8-method recording-signal processing section 1, the 24-to-25 conversion section 4, the sync and ITI generating section 5, the modulation section 7, the parallel-to-serial conversion section 8, the rotating head 10, and the magnetic tape 21, the same circuit devices as those used in the digital-8 method can be used. In the same way, as the components in the recording system shown in FIG. 9 except the MPEG-method reproduction-signal processing section 48, more specifically, as the amplifier 41, the analog-to-digital conversion section 42, the demodulation section 43, the ID detecting section 44, the 25-to-24 conversion section 45, and the digital-8-method reproduction-signal processing section 47, the same circuit devices as those used for the digital-8 format can be used. Therefore, an apparatus which allows not only an SD video signal but also an HD video signal to be recorded and to be reproduced is implemented at a low cost.

The above-described series of processing can be executed by software as well as by hardware. When the series of processing is achieved by software, a program constituting the software is installed from a recording medium to a computer built in a special hardware, or to a unit which can execute various functions after various programs are installed therein, such as a general-purpose personal computer.

The recording medium can be a package medium which stores the program and is distributed for providing the users with the program, separately from a magnetic-tape recording and reproduction apparatus, as shown in FIG. 2 and FIG. 9, such as a magnetic disk 31 (including a floppy disk), an optical disk 32 (including a compact disk-read only memory (CD-ROM) and a digital versatile disk (DVD)), a magneto-optical disk 33 (including a Mini disk (MD)), or a semiconductor memory 34. The recording medium can also be a device which stores the program and is provided for the users in a state in which it is built in an apparatus in advance, such as a ROM or a hard disk.

In the present specification, steps describing the program stored in a recording medium include processes performed in a time sequential manner in the order in which they are described, and in addition, include processes which are not necessarily performed in a time sequential manner but executed in parallel or independently.

As described above, according to a magnetic-tape recording apparatus, a magnetic-tape recording method, and a program stored in a recording medium of the present invention, first-group data and second-group data are synthesized such that they are continuous without any space disposed therebetween on each of two sub-tracks formed with a gap disposed therebetween on a track in a magnetic tape and recorded into the magnetic tape. Therefore, a large amount of data, typical of which is the data of an HD video signal, can be recorded on the magnetic tape in a digital manner.

According to a magnetic-tape format of the present invention, first-group data and second-group data are recorded such that they are continuous without any space disposed therebetween on each of two sub-tracks formed with a gap disposed therebetween. Therefore, a magnetic tape in which a large amount of data, typical of which is the data of an HD video signal, is recorded can be implemented.

According to a magnetic-tape recording apparatus, a magnetic-tape recording method, and a program stored in a recording medium of the present invention, first-group data and second-group data are synthesized such that they are continuous without any space disposed therebetween on a track in a magnetic tape, and third-group data is synthesized such that a gap is formed between the first-group data and the third-group data. Therefore, a large amount of data, typical of which is the data of an HD video signal, can be recorded on the magnetic tape in a digital manner.

According to a magnetic-tape format of the present invention, first-group data and second-group data are recorded such that they are continuous without any space disposed therebetween, and third-group data is recorded such that a gap is formed between the first-group data and the third-group data. Therefore, an HD video signal can be recorded, and after-recording of audio data is allowed.

What is claimed is:

1. A magnetic-tape recording apparatus for recording digital data on a magnetic tape by a rotating head, comprising:

first obtaining means for obtaining first-group data, including video data, audio data, or search data, wherein the first-group data has a sector structure of a main data area storing said video data, said audio data, or said search data and a sync block header identifying the type of the main data;

second obtaining means for obtaining second-group data, including sub-code data related to the first-group data;

third obtaining means for obtaining third-group data, including track information;

synthesizing means for synthesizing the first-group data, the second-group data and the third group data such that they are continuous without any space disposed therebetween on a track in the magnetic tape; and sending means for sending data synthesized by the synthesizing means to the rotating head in order to record the data on the magnetic tape, wherein the track includes at least two sub-track data areas each having a respective main data area and each main data area includes a respective sync block header.

2. A magnetic-tape recording apparatus according to claim 1, wherein the video data is high-quality video data compressed by an MP@HL or MP@H-14 method.

3. A magnetic-tape recording method for a magnetic-tape recording apparatus for recording digital data on a magnetic tape by a rotating head, comprising:

a first obtaining step of obtaining first-group data, including video data, audio data, or search data, wherein the first-group data has a sector structure of a main data area storing said video data, said audio data, or said search data and a sync block header identifying the type of the main data;

a second obtaining step of obtaining second-group data, including sub-code data related to the first-group data;

a third obtaining step of obtaining third-group data, including track information;

a synthesizing step of synthesizing the first-group data, the second-group data and the third group data such that they are continuous without any space disposed therebetween on a track in the magnetic tape; and a sending step of sending data synthesized by a process in the synthesizing step to the rotating head in order to record the data on the magnetic tape, wherein the track includes at least two sub-track data areas each having a respective main data area and each main data area includes a respective sync block header.

4. A recording medium storing a computer-readable program executed by a processor for performing a method for controlling a magnetic-tape recording apparatus that records digital data on a magnetic tape by a rotating head, the method comprising:

a first obtaining step of obtaining first-group data, including video data, audio data, or search data, wherein the first-group data has a sector structure of a main data area storing said video data, said audio data, or said search data and a sync block header identifying the type of the main data;

a second obtaining step of obtaining second-group data, including sub-code data related to the first-group data;

a third obtaining step of obtaining third-group data, including track information;

a synthesizing step of synthesizing the first-group data, the second-group data and the third group data such that they are continuous without any space disposed therebetween on a track in the magnetic tape; and a sending step of sending data synthesized by a process in the synthesizing step to the rotating head in order to record the data on the magnetic tape, wherein the track includes at least two sub-track data areas each having a respective main data area and each main data area includes a respective sync block header.

* * * * *